United States Patent
Hirakuri

(10) Patent No.: US 11,425,381 B2
(45) Date of Patent: Aug. 23, 2022

(54) IMAGE ENCODING APPARATUS AND COMPUTER READABLE MEDIUM

(71) Applicant: Mitsubishi Electric Corporation, Chiyoda-ku (JP)

(72) Inventor: Shinya Hirakuri, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/950,084

(22) Filed: Nov. 17, 2020

(65) Prior Publication Data

US 2021/0076039 A1 Mar. 11, 2021

Related U.S. Application Data

(62) Division of application No. 16/332,929, filed as application No. PCT/JP2016/077911 on Sep. 21, 2016, now abandoned.

(51) Int. Cl.
*H04N 11/02* (2006.01)
*H04N 19/124* (2014.01)
(Continued)

(52) U.S. Cl.
CPC ............ *H04N 19/124* (2014.11); *H04N 1/41* (2013.01); *H04N 19/13* (2014.11);
(Continued)

(58) Field of Classification Search
CPC .... H04N 19/124; H04N 19/13; H04N 19/176; H04N 19/186; H04N 19/625; H04N 1/41
(Continued)

(56) References Cited

U.S. PATENT DOCUMENTS 4,984,076 A * 1/1991 Watanabe ............ H04N 19/176
375/240.2
5,162,898 A 11/1992 Aono
(Continued)

FOREIGN PATENT DOCUMENTS

JP 2-100465 A 4/1990
JP 7-46596 A 2/1995
(Continued)

OTHER PUBLICATIONS

International Search Report dated Oct. 18, 2016 in PCT/JP2016/077911, 2 pages.

(Continued)

*Primary Examiner* — Jayanti K Patel
*Assistant Examiner* — Richard B Carter
(74) *Attorney, Agent, or Firm* — Oblon, McClelland, Maier & Neustadt, L.L.P.

(57) ABSTRACT

A coefficient conversion unit obtains a conversion coefficient for each image region by performing coefficient conversion for each image region. A luminance distribution extraction unit generates luminance distribution information indicating a luminance of each image region. A correction coefficient determination unit determines a correction coefficient based on the luminance distribution information for each image region. A quantization width correction unit obtains a corrected quantization width for each image region by correcting a quantization width with use of a correction coefficient of an image region for each image region. A scalar quantization unit obtains a quantized conversion coefficient for each image region by quantizing a conversion coefficient of an image region with use of a corrected quantization width for each image region. An entropy encoding unit obtains an encoded conversion coefficient for (Continued)

each image region by performing entropy encoding on a quantized conversion coefficient for each image region.

3 Claims, 30 Drawing Sheets

(51) Int. Cl.
  *H04N 19/625* (2014.01)
  *H04N 19/176* (2014.01)
  *H04N 19/186* (2014.01)
  *H04N 19/13* (2014.01)
  *H04N 1/41* (2006.01)
(52) U.S. Cl.
  CPC ......... *H04N 19/176* (2014.11); *H04N 19/186* (2014.11); *H04N 19/625* (2014.11)
(58) Field of Classification Search
  USPC ......... 375/240.03, 240.01, 240.2; 348/400.1; 382/250, 254, 251
  See application file for complete search history.

(56) References Cited

U.S. PATENT DOCUMENTS

| | | | | |
|---|---|---|---|---|
| 5,410,350 A * | 4/1995 | Kato | ................... | H04N 19/61 |
| | | | | 348/400.1 |
| 5,473,377 A | 12/1995 | Kim | | |
| 5,481,309 A * | 1/1996 | Juri | ................... | H04N 5/9264 |
| | | | | 375/240.03 |
| 6,449,395 B1 * | 9/2002 | Kobayashi | ........... | H04N 19/126 |
| | | | | 382/251 |
| 2003/0103679 A1 * | 6/2003 | Etoh | ................... | H04N 19/12 |
| | | | | 382/250 |
| 2005/0008245 A1 * | 1/2005 | Katougi | ............... | H04N 1/4052 |
| | | | | 382/254 |

FOREIGN PATENT DOCUMENTS

| | | |
|---|---|---|
| JP | 7-115664 A | 5/1995 |
| JP | 2003-319393 A | 11/2003 |
| JP | 2009-10612 A | 1/2009 |
| JP | 2010-68269 A | 3/2010 |
| JP | 2014-135551 A | 7/2014 |

OTHER PUBLICATIONS

ISO/IEC 10918-1: 1994, Retrieved from the Internet https://www.iso.org/standard/18902.html , 3 pages (submitting abstract only).
ISO/IEC 15444-1: 2004, Retrieved from the Internet https://www.iso.org/standard/37674.html , 4 pages (submitting abstract only).
Japanese Office Action dated Dec. 10, 2019 in Japanese Patent Application No. 2018-540544 (with unedited computer generated English translation), 10 pages.

* cited by examiner

IMAGE ENCODING APPARATUS AND COMPUTER READABLE MEDIUM

CROSS REFERENCE TO RELATED APPLICATIONS

This application is a division of and claims the benefit of priority under 35 U.S.C. § 120 from U.S. application Ser. No. 16/332,929 filed Mar. 13, 2019, the entire contents of which are incorporated herein by reference. U.S. application Ser. No. 16/332,929 is a National Stage of PCT/JP2016/077911 filed Sep. 21, 2016.

TECHNICAL FIELD

The present invention relates to encoding and decoding of images.

BACKGROUND ART

In recent years, an amount of data of images has increased sharply with resolution of images being increased, and importance of image encoding methods and image decoding methods for efficiently compressing the amount of data of images has increased.

As an image encoding method, there are a lossless compression encoding method in which image degradation does not occur before and after encoding and decoding, and a lossy compression encoding method in which an original image is not completely restored by decoding since compression errors occur in encoding.

Comparing these methods, the lossy compression encoding method is superior from the viewpoint of compression efficiency. For this reason, the lossy compression method is generally used except for special use.

As the lossy compression encoding method of the image, a joint photographic experts group (JPEG) or JPEG 2000 is generally used.

In a case of JPEG, two-dimensional discrete cosine transformation is used for coefficient conversion and coefficient inverse conversion, and Huffman encoding is used for entropy encoding and entropy decoding. Further, scalar quantization is adopted. Scalar quantization is quantization before entropy encoding.

In a case of JPEG 2000, recursive two-dimensional discrete wavelet transformation is used for coefficient conversion and coefficient inverse conversion, and arithmetic codes are used for entropy encoding and entropy decoding. Further, scalar quantization or post quantization is adopted. Post quantization is quantization after entropy encoding.

Quantization is a process for reducing information. When a part of image information is discarded by quantization, a difference occurs between a decompressed image and an original image. This difference is referred to as a compression error. For JPEG and JPEG 2000, a quantization width is controlled in accordance with frequency components. Specifically, a quantization width of a high frequency component is large and a quantization width of a low frequency component is small. Since a reduction amount of information of the high frequency component is large when the quantization width of the high frequency component is large, compression efficiency is secured. Since a reduction amount of information of the low frequency component is small when the quantization width of the low frequency component is small, image quality is secured. Human eyes are sensitive to a slowly changing difference but insensitive to a quickly changing difference. Therefore, even if the reduction amount of high frequency component information is large, deterioration of image quality is small when viewed through human eyes.

However, in JPEG and JPEG 2000, the quantization width is not controlled in accordance with brightness. Thus, quantization causes a same level of compression error between a bright part in an image and a dark part in the image. Therefore, a signal-to-noise ratio (SN ratio) representing a ratio of a luminance value to a compression error is worse in the dark part in the image than that in the bright part in the image. This results in deterioration of image quality of a high-precision image obtained by utilizing a limit performance of the SN ratio in an image sensor. Specifically, recognition of a dark part becomes difficult.

For example, image quality of a high-precision image such as a medical image to be used in a medical site and a remote sensing image obtained by an artificial satellite is deteriorated. Further, when gradation correction is performed on a dark part of an image such as a backlit picture, noise accompanying a compression error is emphasized and the image quality is deteriorated.

Non Patent Literature 1 discloses technical contents of JPEG, and Non Patent Literature 2 discloses technical contents of JPEG 2000.

CITATION LIST

Non Patent Literature

Non Patent Literature 1: ISO/IEC 10918-1: 1994
Non Patent Literature 2: ISO/IEC 15444-1: 2004

SUMMARY OF INVENTION

Technical Problem

It is an object of the present invention to enable encoding of an image in consideration of a luminance of the image.

Solution to Problem

An image encoding apparatus according to the present invention includes:
a correction coefficient determination unit to determine a correction coefficient to be used for correction of a quantization width, based on a luminance of an image region for each image region that is a part of an image.

Advantageous Effects of Invention

According to the present invention, since a correction coefficient is determined for each image region, it is possible to correct a quantization width for each image region. Therefore, it is possible to encode the image in consideration of a luminance of the image.

DESCRIPTION OF EMBODIMENTS

Figure 1:
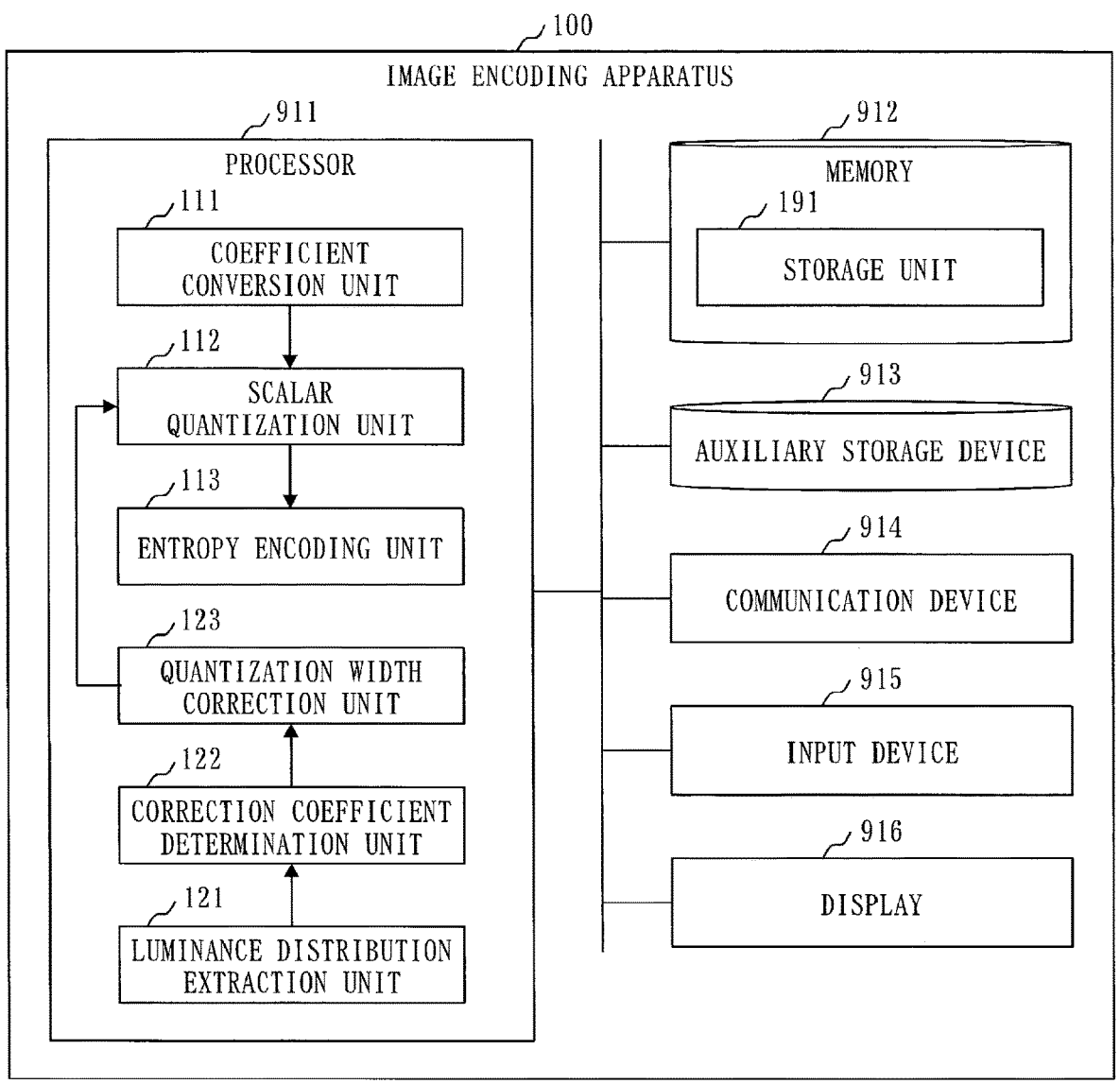
FIG. 1 is a configuration diagram of an image encoding apparatus 100 in a first embodiment.

In the embodiments and the drawings, the same elements or mutually corresponding elements are denoted by the same reference numerals. The description of the elements denoted by the same reference numerals will be omitted or simplified appropriately. Arrows in the figures mainly indicate a flow of data or processing.

First Embodiment

An image encoding apparatus 100 and an image decoding apparatus 200 will be described with reference to FIGS. 1 to 5.

\*\*\* Description of Configuration \*\*\*

A configuration of the image encoding apparatus 100 for encoding an image will be described with reference to FIG. 1.

The image encoding apparatus 100 is a computer including hardware such as a processor 911, a memory 912, an auxiliary storage device 913, a communication device 914, an input device 915, and a display 916. These pieces of hardware are connected to each other via a signal line.

The processor 911 is an integrated circuit (IC) to perform processing, and controls other hardware. Specifically, the processor 911 is a CPU, a DSP, or a GPU. The CPU is an abbreviation for Central Processing Unit, DSP is an abbreviation for Digital Signal Processor, and GPU is an abbreviation for Graphics Processing Unit.

The memory 912 is a volatile storage device. The memory 912 is also referred to as a main storage device or a main memory. Specifically, the memory 912 is a random access memory (RAM).

The auxiliary storage device 913 is a non-volatile storage device. Specifically, the auxiliary storage device 913 is ROM, HDD or a flash memory. ROM is an abbreviation for Read Only Memory, and HDD is an abbreviation for Hard Disk Drive.

The communication device 914 is a device to perform communication, and includes a receiver and a transmitter. Specifically, the communication device 914 is a communication chip or network interface card (NIC).

The input device 915 is a device to accept an input. Specifically, the input device 915 is a keyboard, a mouse, a numeric keypad, or a touch panel.

The display 916 is a display device to display images and the like. Specifically, the display 916 is a liquid crystal display. The display 916 is also referred to as a monitor.

The image encoding apparatus 100 includes "units" such as a coefficient conversion unit III, a scalar quantization unit 112, an entropy encoding unit 113, a luminance distribution extraction unit 121, a correction coefficient determination unit 122, and a quantization width correction unit 123, as elements of a functional configuration. In the description of FIG. 1, the "unit" means an element of a functional configuration provided to the image encoding apparatus 100.

A function of the "unit" is realized by software. The function of the "unit" will be described later.

In the auxiliary storage device 913, a program for realizing the function of the "unit" is stored. The program for realizing the function of the "unit" is loaded into the memory 912 and executed by the processor 911.

In addition, the auxiliary storage device 913 stores an operating system (OS). At least a part of the OS is loaded into the memory 912 and executed by the processor 911.

That is, the processor 911 executes the program for realizing the function of the "unit" while executing the OS.

Data obtained by executing the program for realizing the function of the "unit" is stored in a storage device such as the memory 912, the auxiliary storage device 913, a register in the processor 911, or a cache memory in the processor 911.

The memory 912 functions as a storage unit 191 that stores data to be used, generated, inputted, outputted, transmitted, or received by the image encoding apparatus 100. However, another storage device may function as the storage unit 191.

The communication device 914 functions as a communication unit that communicates data. In the communication device 914, the receiver functions as a reception unit that receives data, and the transmitter functions as a transmission unit that transmits data.

The input device 915 functions as an acceptance unit that accepts an input.

The display 916 functions as a display unit that displays images and the like.

The image encoding apparatus 100 may include a plurality of processors substituting for a processor 911. The plurality of processors share execution of the program for realizing the function of the "unit".

The program for realizing the function of the "unit" can be stored in a non-volatile storage medium such as a magnetic disk, an optical disk, a flash memory, or the like in a computer readable manner. The non-volatile storage medium is a non-transitory tangible medium.

The "unit" may be replaced with "process" or "step". The function of "unit" may be realized by firmware.

A configuration of the image decoding apparatus 200 for decoding an image will be described with reference to FIG. 2.

The image decoding apparatus 200 is a computer including hardware such as a processor 921, a memory 922, an auxiliary storage device 923, a communication device 924, an input device 925, and a display 926. These pieces of hardware are connected to each other via a signal line.

The processor 921, the memory 922, the auxiliary storage device 923, the communication device 924, the input device 925, and the display 926 are hardware similar to the hardware included in the image encoding apparatus 100.

The image decoding apparatus 200 includes "units" such as a coefficient inverse conversion unit 211, a scalar inverse quantization unit 212, an entropy decoding unit 213, a correction coefficient determination unit 221, and a quantization width correction unit 222, as elements of a functional configuration. In the description of FIG. 2, the "unit" means an element of a functional configuration provided to the image decoding apparatus 200.

A function of the "unit" is realized by software. The function of the "unit" will be described later.

In the auxiliary storage device 923, a program for realizing the function of the "unit" is stored. The program for realizing the function of the "unit" is loaded into the memory 922 and executed by the processor 921.

Data obtained by executing the program for realizing the function of the "unit" is stored in a storage device such as the memory 922, the auxiliary storage device 923, a register in the processor 921, or a cache memory in the processor 921.

The memory 922 functions as a storage unit 291 that stores data to be used in the image decoding apparatus 200. However, another storage device may function as the storage unit 291.

The communication device 924 functions as a communication unit that communicates data. In the communication device 924, the receiver functions as a reception unit that receives data, and the transmitter functions as a transmission unit that transmits data.

The input device 925 functions as an acceptance unit that accepts an input.

The display 926 functions as a display unit that displays images and the like.

The image decoding apparatus 200 may include a plurality of processors substituting for the processor 921. The plurality of processors share execution of the program for realizing the function of the "unit".

The program for realizing the function of "unit" can be stored in a non-volatile storage medium in a computer readable manner. The non-volatile storage medium is a non-transitory tangible medium.

The "unit" may be replaced with "process" or "step". The function of "unit" may be realized by firmware.

\*\*\* Description of Operation \*\*\*

An operation of the image encoding apparatus 100 corresponds to an image encoding method. Further, a procedure of the image encoding method corresponds to a procedure of an image encoding program.

An operation of the image decoding apparatus 200 corresponds to an image decoding method. Further, a procedure of the image decoding method corresponds to a procedure of an image decoding program.

The image encoding method will be described with reference to FIG. 3.

It is assumed that image data including an image is stored in the storage unit 191.

Step S111 is a coefficient conversion process.

In step S111, the coefficient conversion unit 111 performs coefficient conversion for each image region with use of the image data. This allows a conversion coefficient to be obtained for each image region.

The image region is a portion obtained by dividing an image. That is, the image region is a part of the image. For example, the image region is a region of 8×8 pixels.

The conversion coefficient is a coefficient obtained by performing coefficient conversion.

Specifically, the coefficient conversion unit 111 performs two-dimensional DCT for each image region. This allows a DCT coefficient to be obtained for each image region. DCT is an abbreviation for Discrete Cosine Transformation. The DCT coefficient is a coefficient for each frequency component.

Step S112 is a luminance distribution extraction process.

In step S112, the luminance distribution extraction unit 121 generates luminance distribution information with use of the image data.

The luminance distribution information is information indicating a luminance of each image region. For example, the luminance of the image region is an average of a plurality of luminances of a plurality of pixels constituting the image region.

Specifically, the luminance distribution extraction unit 121 generates a reduced image as luminance distribution information. The reduced image is an image obtained by reducing an original image, and is also referred to as a thumbnail image.

A pixel in the reduced image corresponds to an image region in the original image, and a luminance of the pixel in the reduced image corresponds to the luminance of the image region in the original image.

Step S113 is a correction coefficient determination process.

In step S113, the correction coefficient determination unit 122 determines a correction coefficient for each image region with use of the luminance distribution information.

That is, the correction coefficient determination unit 122 determines a correction coefficient on the basis of a luminance of the image region for each image region.

The correction coefficient is a value to be used for correcting a quantization width.

The quantization width is a value for each frequency component, and corresponds to an element included in a quantization table to be used in JPEG. The quantization width is stored in advance in the storage unit 191.

Each correction coefficient is a value to be multiplied to a quantization width, and is larger as the image region is brighter and smaller as the image region is darker. That is, each correction coefficient is larger than a correction coefficient of an image region that is darker than the image region, and smaller than a correction coefficient of an image region that is brighter than the image region.

In addition, each correction coefficient has the following feature (1) or (2).

(1) Each correction coefficient is proportional to a luminance of the image region. That is, a ratio of the correction coefficient of the image region to a correction coefficient of another image region corresponds to a ratio of the luminance of the image region to a luminance of the another image region.

(2) Each correction coefficient is proportional to the ½ power of the luminance of the image region. ½ means one-half. That is, a ratio of the correction coefficient of the image region to a correction coefficient of another image region corresponds to a ratio of the ½ power of the luminance of the image region to the ½ power of a luminance of the another image region.

The correction coefficient determination unit 122 may determine the correction coefficient for each image region through any procedure.

For example, the correction coefficient determination unit 122 may calculate a correction coefficient corresponding to a luminance of the image region by calculating a predefined expression, or may acquire a correction coefficient corresponding to a luminance of the image region from a predefined table.

Step S114 is a quantization width correction process.

In step S114, the quantization width correction unit 123 corrects a quantization width with use of a correction coefficient of the image region for each image region. This allows a corrected quantization width to be obtained for each image region.

The corrected quantization width is larger as the image region is brighter and smaller as the image region is darker.

Specifically, the quantization width correction unit 123 calculates a corrected quantization width by calculating the following expression.

$$\Delta q = \Delta q_{lum} \times \Delta q_{nom}$$

$\Delta q$ is a corrected quantization width.
$\Delta q_{lum}$ is a correction coefficient.
$\Delta q_{nom}$ is an uncorrected quantization width.

Step S115 is a scalar quantization process.

In step S115, the scalar quantization unit 112 quantizes a conversion coefficient of the image region with use of a corrected quantization width for each image region. This allows a quantized conversion coefficient to be obtained for each image region. A method of the quantization is the same as a conventional one.

Step S116 is an entropy encoding process.

In step S116, the entropy encoding unit 113 performs entropy encoding on a quantized conversion coefficient for each image region. This allows compressed data to be obtained. The compressed data is data including an encoded conversion coefficient for each image region. A method of the entropy encoding is the same as a conventional one.

Figure 4:
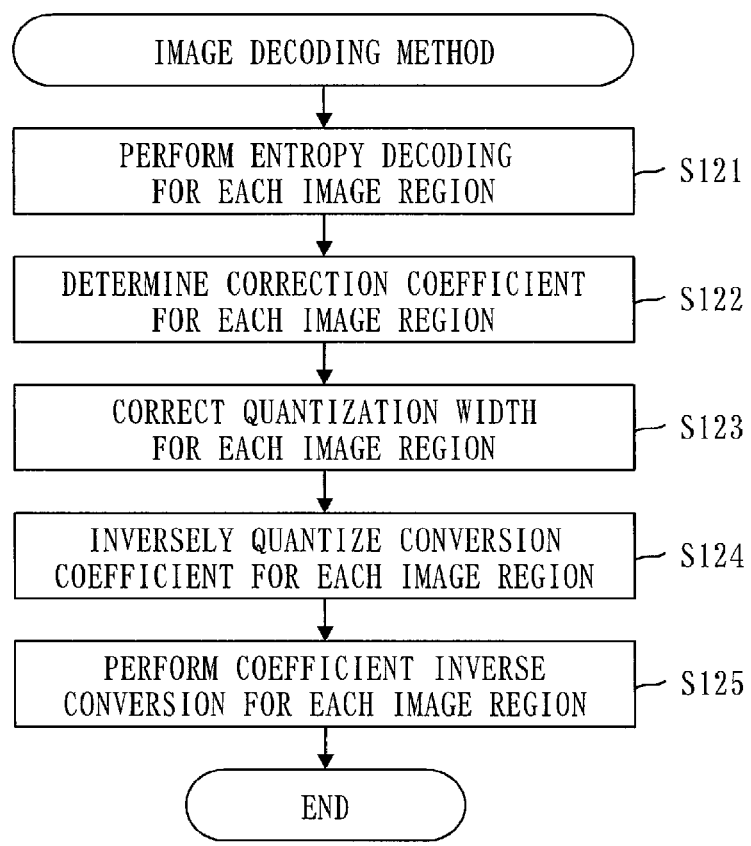
FIG. 4 is a flowchart of an image decoding method in the first embodiment.

The image decoding method will be described with reference to FIG. 4.

It is assumed that the compressed data obtained in step S116 of the image encoding method (FIG. 3) is stored in the storage unit 291.

Further, it is assumed that the luminance distribution information obtained in step S112 of the image encoding method (FIG. 3) is stored in the storage unit 291.

Step S121 is an entropy decoding process.

In step S121, the entropy decoding unit 213 performs entropy decoding on an encoded conversion coefficient for each image region with use of the compressed data. This allows a quantized conversion coefficient to be obtained for each image region. A method of the entropy decoding is the same as a conventional one.

Step S122 is a correction coefficient determination process.

In step S122, the correction coefficient determination unit 221 determines a correction coefficient for each image region with use of the luminance distribution information.

That is, the correction coefficient determination unit 221 determines a correction coefficient on the basis of a luminance of the image region for each image region.

Figure 3:
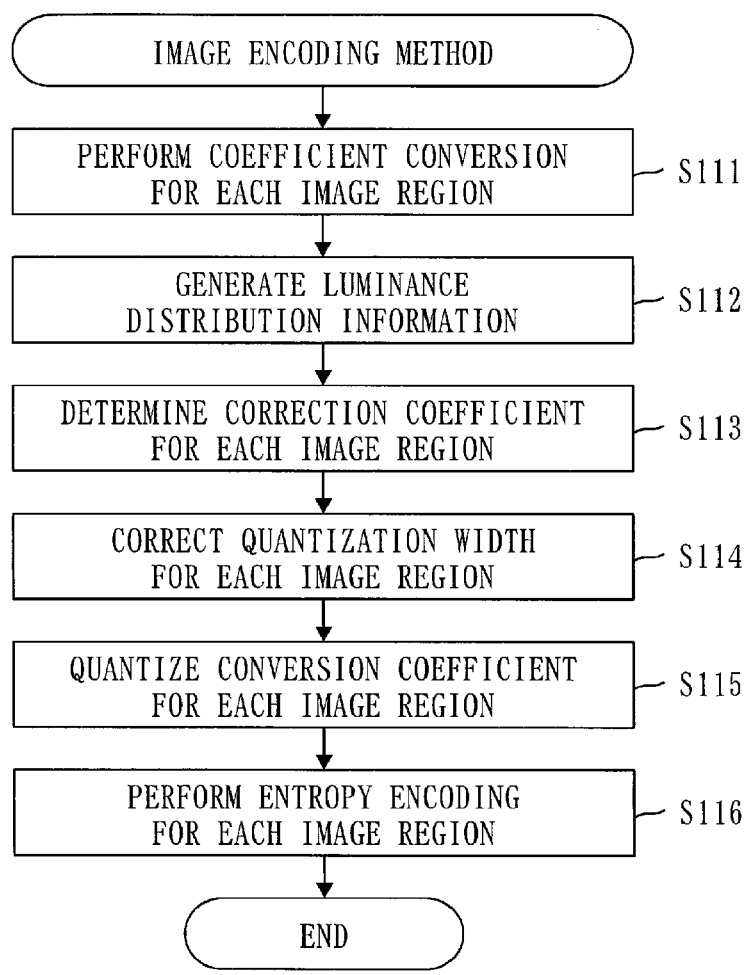
FIG. 3 is a flowchart of an image encoding method in the first embodiment.

Features of the correction coefficient and a method of determining the correction coefficient are the same as those in step S113 of the image encoding method (FIG. 3).

Step S123 is a quantization width correction process.

In step S123, the quantization width correction unit 222 corrects a quantization width with use of a correction coefficient of the image region for each image region. This allows a corrected quantization width to be obtained for each image region. A method of correcting the quantization width is the same as that in step S114 of the image encoding method (FIG. 3).

Step S124 is a scalar inverse quantization process.

In step S124, the scalar inverse quantization unit 212 inversely quantizes a quantized conversion coefficient with use of a corrected quantization width for each image region. This allows a conversion coefficient of the image region to be obtained for each image region. A method of the inverse quantization is the same as a conventional one.

Step S125 is a coefficient inverse conversion process.

In step S125, the coefficient inverse conversion unit 211 performs coefficient inverse conversion on a conversion coefficient of the image region for each image region. Specifically, the coefficient inverse conversion unit 211 performs two-dimensional inverse DCT for each image region. This allows image data including a decoded image to be obtained.

* Effect of First Embodiment *

In the first embodiment, a correction coefficient is determined on the basis of a luminance of the image region for each image region. Then, a quantization width is corrected with use of a correction coefficient for each image region. In other words, the quantization width is controlled in accordance with brightness of the image region for each image region.

Since a correction coefficient of a bright region is large and a correction coefficient of a dark region is small, a compression error of the bright region becomes large and the compression error of the dark region becomes small. As a result, deterioration of the image quality in the dark part and emphasis of a compression error due to gradation correction are suppressed.

That is, it is possible to provide an image encoding method, an image encoding apparatus, an image decoding method, and an image decoding apparatus for suppressing deterioration of an SN ratio of a dark part.

Next, an effect that is exerted in a case where a correction coefficient is proportional to a luminance will be described.

Since the correction coefficient is proportional to a luminance, a compression error is distributed in proportion to the luminance. Therefore, a ratio of the compression error to the luminance, that is, a relative error with respect to the luminance is constant. As a result, even when a dynamic range of a luminance is changed, it is possible to suppress a conspicuous compression error in a portion having a specific luminance.

Next, an effect that is exerted in a case where a correction coefficient is proportional to the ½ power of the luminance will be described.

Generally, in an optical sensor such as a CCD sensor or a CMOS sensor, a component called sensor noise or shot noise occurs. CCD is an abbreviation for Charge-Coupled Device, and CMOS is an abbreviation for Complementary Metal Oxide Semiconductor.

The sensor noise is random noise proportional to ½ of a luminance value. Therefore, even if a compression error is excessively small as compared with the sensor noise, an influence on subjective image quality is small.

In a case of considering such characteristics for maximum utilization of the SN characteristic of the sensor, a compression error is distributed in proportion to ½ of the luminance by the correction coefficient being proportional to the ½ power of the luminance.

Figure 5:
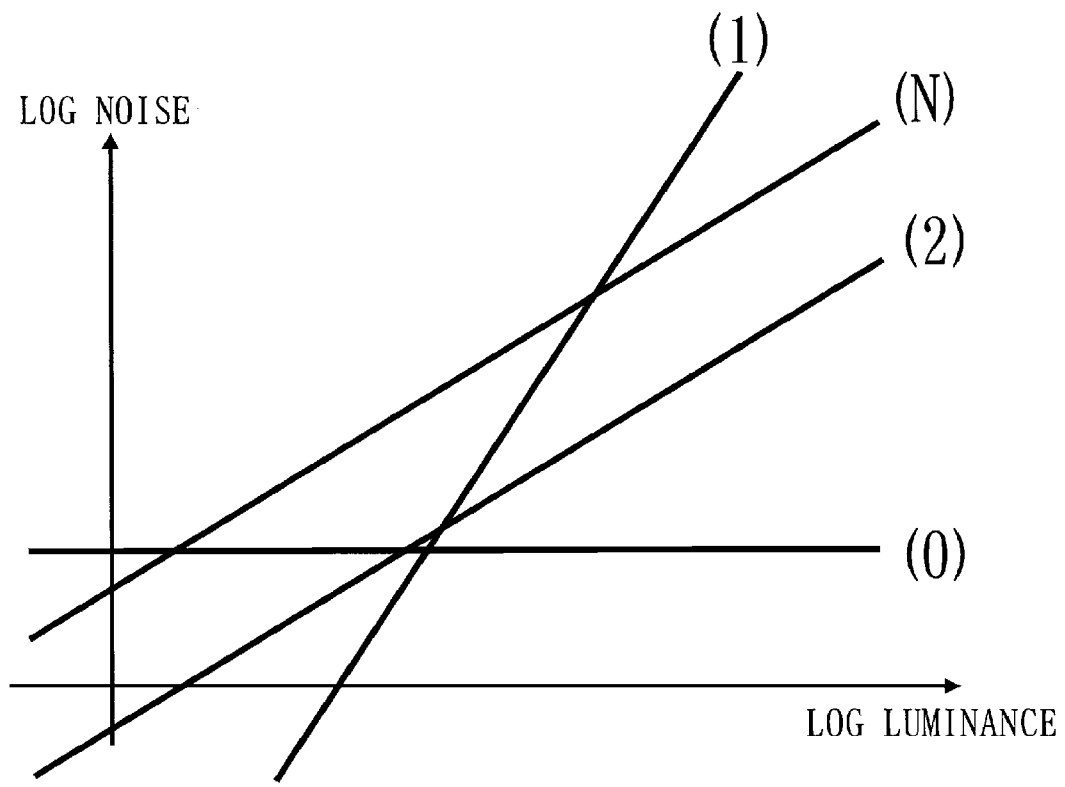
FIG. 5 is a view illustrating a relationship between a luminance and noise in the first embodiment.

In FIG. 5, (N) is a graph illustrating sensor noise, and (0) is a graph illustrating conventional distribution of a compression error. Further, (1) is a graph illustrating distribution of a compression error in a case where a correction coefficient is proportional to a luminance, and (2) is a graph illustrating distribution of a compression error in a case where a correction coefficient is proportional to the ½ power of a luminance.

As shown in (0) of FIG. 5, in a case where a quantization width is not corrected in accordance with a luminance, a compression error is excessively small as compared with the sensor noise (N) in a bright part, and a compression error is large as compared with the sensor noise (N) in a dark part.

As shown in (1) of FIG. 5, in a case where a correction coefficient is proportional to a luminance and a quantization width is corrected with use of a correction coefficient, a compression error may become large in a bright part as compared with the sensor noise (N).

As shown in (2) of FIG. 5, in a case where a correction coefficient is proportional to the ½ power of a luminance and a quantization width is corrected with use of a correction coefficient, a compression error is distributed similarly to the sensor noise. That is, the compression error is optimized in all parts irrespective of the luminance. Therefore, it is possible to utilize the SN characteristics of the sensor to the maximum.

* Other Configuration *

The first embodiment may be applied to either a monochrome image or a color image.

Figure 2:
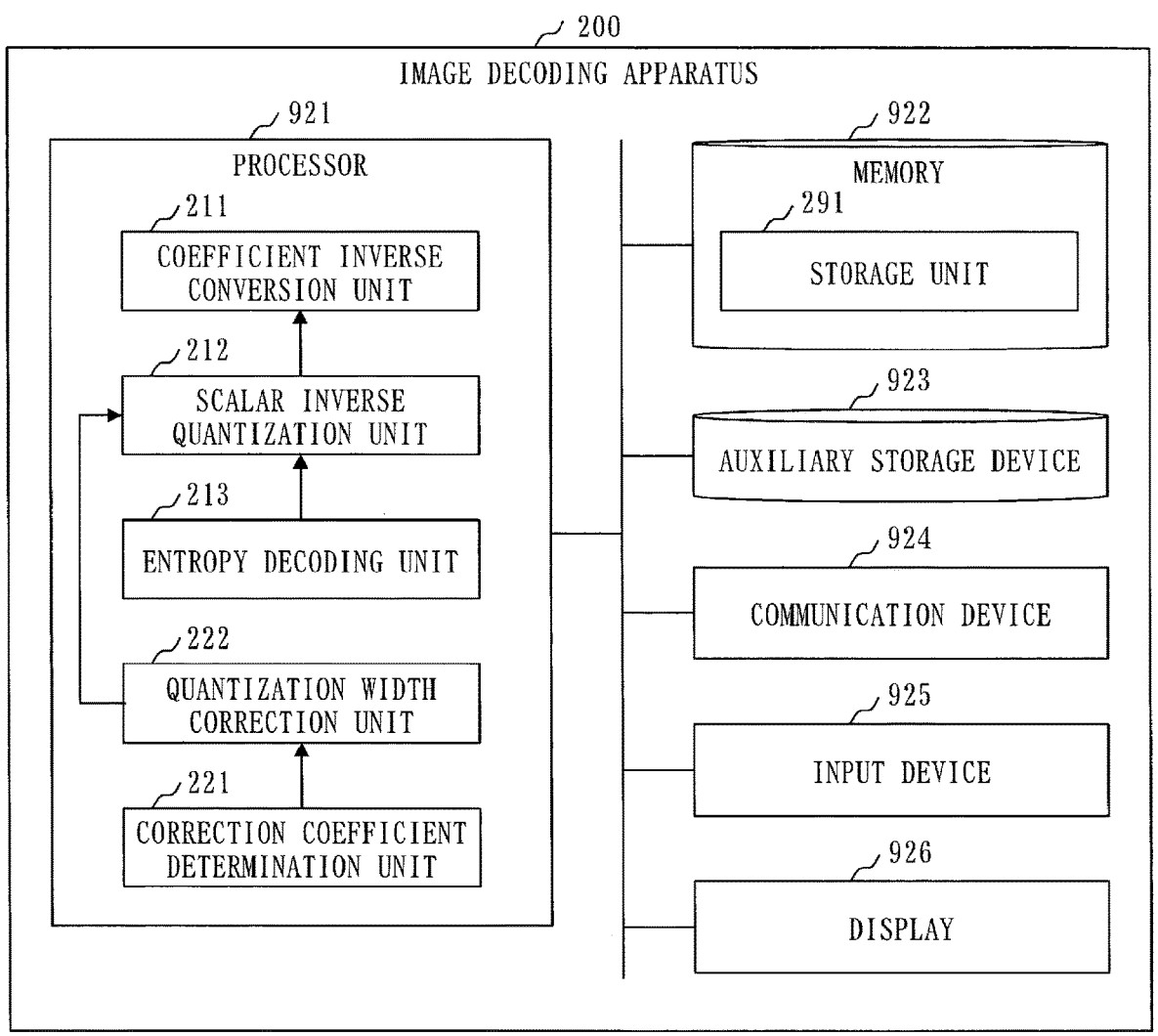
FIG. 2 is a configuration diagram of an image decoding apparatus 200 in the first embodiment.

The configuration of the image encoding apparatus 100 illustrated in FIG. 1 and the configuration of the image decoding apparatus 200 illustrated in FIG. 2 are configurations suitable for a monochrome image.

Figure 6:
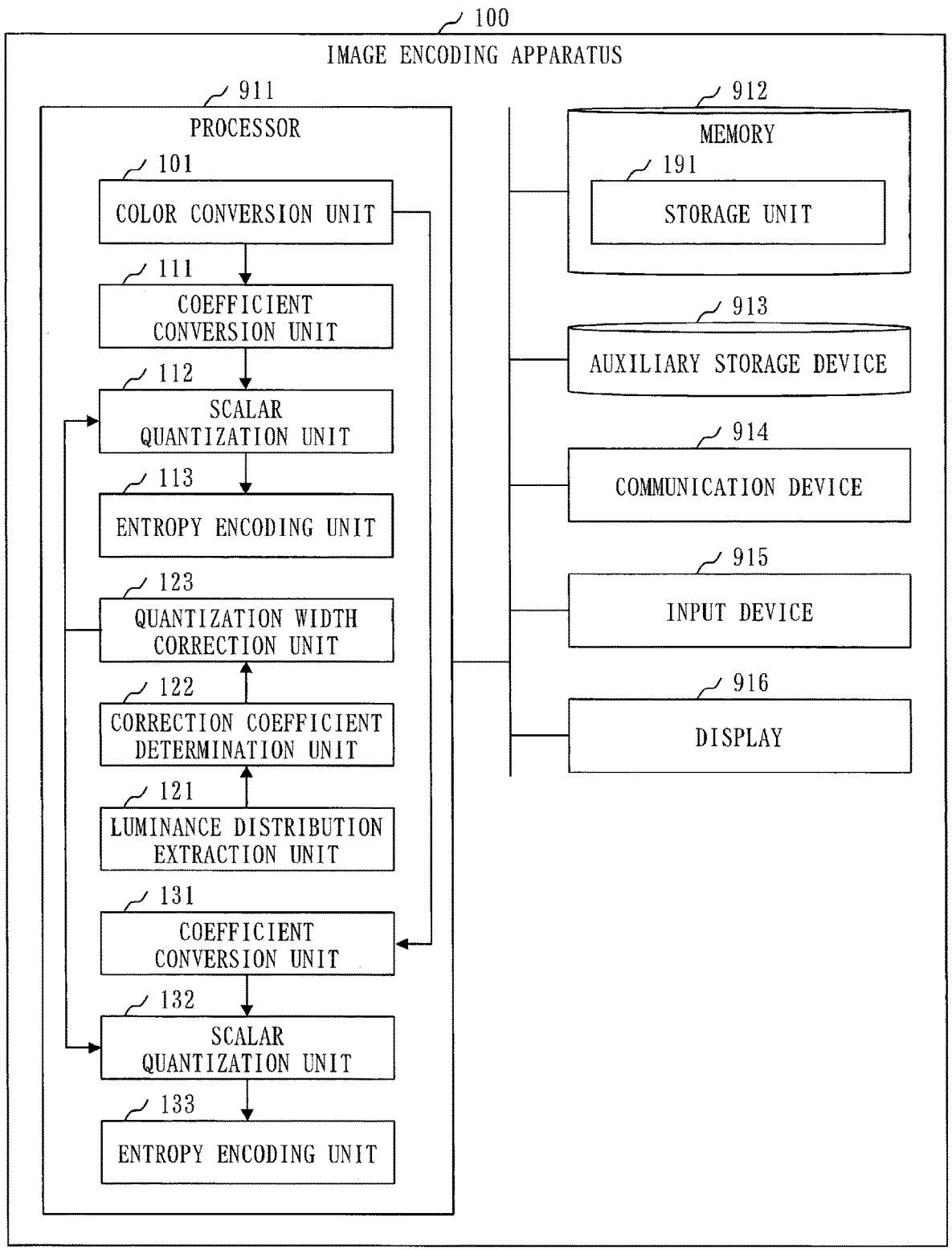
FIG. 6 is another configuration diagram of the image encoding apparatus 100 in the first embodiment.

A configuration of the image encoding apparatus 100 suitable for a color image will be described with reference to FIG. 6.

In addition to the elements of the functional configuration illustrated in FIG. 1, the image encoding apparatus 100 includes a color conversion unit 101, a coefficient conversion unit 131, a scalar quantization unit 132, and an entropy encoding unit 133.

The color conversion unit 101 converts image data of a color image into luminance image data and color difference image data. Specifically, RGB format image data is converted into YUV format image data. Y format image data is the luminance image data and UV format image data is the color difference image data.

The coefficient conversion unit 111, the scalar quantization unit 112, and the entropy encoding unit 113 perform processing on luminance image data.

The coefficient conversion unit 131, the scalar quantization unit 132, and the entropy encoding unit 133 perform processing on color difference image data.

Figure 7:
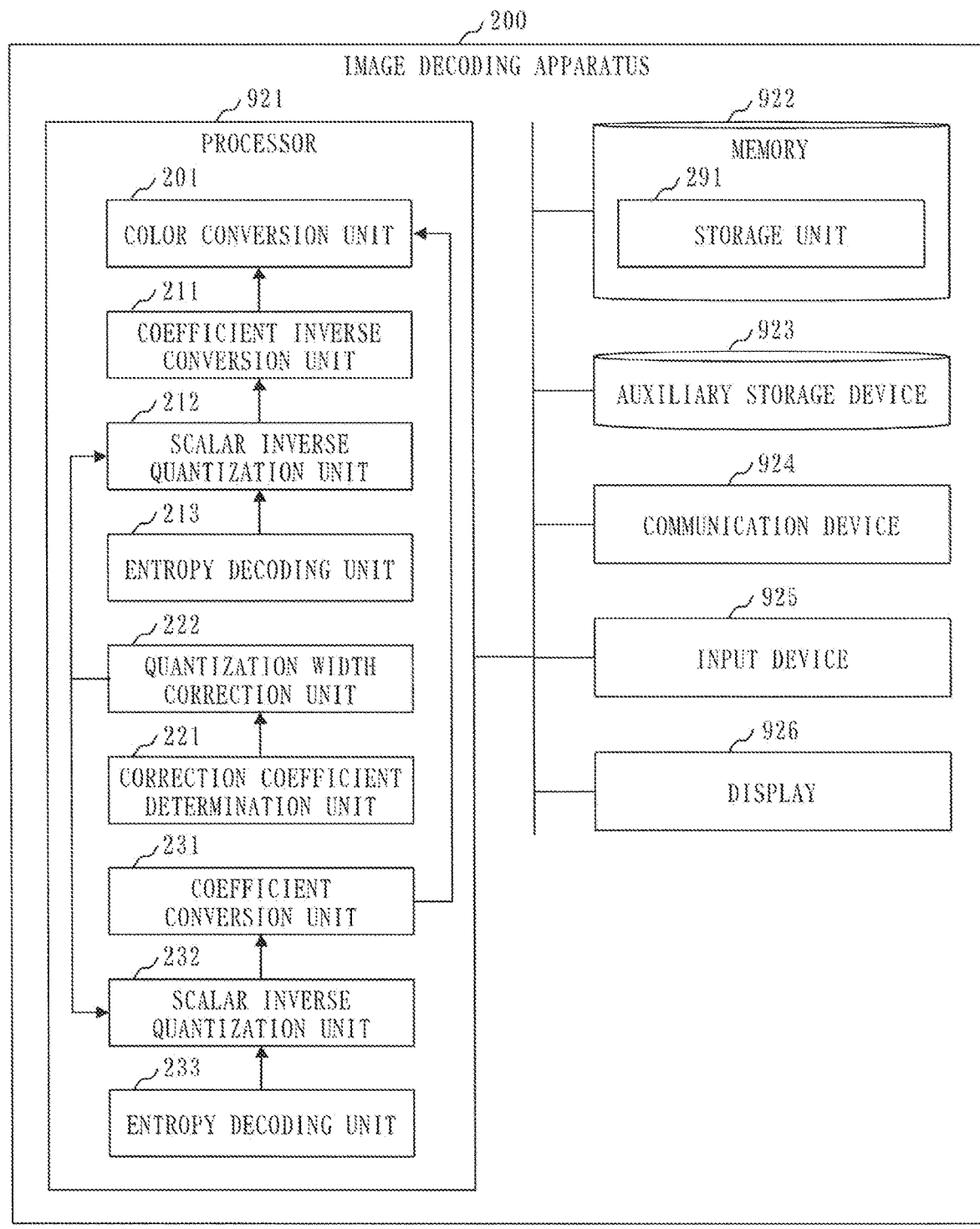
FIG. 7 is another configuration diagram of the image decoding apparatus 200 in the first embodiment.

A configuration of the image decoding apparatus 200 suitable for a color image will be described with reference to FIG. 7.

In addition to the elements of the functional configuration illustrated in FIG. 2, the image decoding apparatus 200 includes a color conversion unit 201, a coefficient conversion unit 231, a scalar inverse quantization unit 232, and an entropy decoding unit 233.

The color conversion unit 201 converts luminance image data and color difference image data into image data of a color image. Specifically, YUV format image data is converted into RGB format image data.

The coefficient inverse conversion unit 211, the scalar inverse quantization unit 212, and the entropy decoding unit 213 perform processing on luminance image data.

The coefficient conversion unit 231, the scalar inverse quantization unit 232, and the entropy decoding unit 233 perform processing on color difference image data.

Similarly to the image encoding apparatus 100, the image decoding apparatus 200 may include a luminance distribution extraction unit 121.

One computer may have the functional configuration of the image encoding apparatus 100 and the functional configuration of the image decoding apparatus 200. The computer including the functional configuration of the image encoding apparatus 100 and the functional configuration of the image decoding apparatus 200 is referred to as an image processing apparatus. Similarly to the image encoding apparatus 100 and the image decoding apparatus 200, the image processing apparatus includes hardware such as a processor, a memory, an auxiliary storage device, a communication device, an input device, and a display. An operation of the image processing apparatus corresponds to an image processing method, and a procedure of the image processing method corresponds to a procedure of an image processing program.

Second Embodiment

Points that are different from the first embodiment as to an aspect of generating luminance distribution information with use of a conversion coefficient will be mainly described with reference to FIGS. 8 to 12.

* Description of Configuration *

A configuration of an image encoding apparatus 100 will be described with reference to FIG. 8.

The image encoding apparatus 100 includes a simulated inverse quantization unit 124 in addition to the elements of the functional configuration illustrated in FIG. 1 in the first embodiment. A function of the simulated inverse quantization unit 124 will be described later.

A configuration of an image decoding apparatus 200 will be described with reference to FIG. 9.

The image decoding apparatus 200 includes a luminance distribution extraction unit 223 and a luminance inverse quantization unit 224 in addition to the elements of the functional configuration illustrated in FIG. 2 in the first embodiment. Functions of the luminance distribution extraction unit 223 and the luminance inverse quantization unit 224 will be described later.

* Description of Operation *

An image encoding method will be described with reference to FIG. 10.

It is assumed that image data including an image is stored in a storage unit 191.

Step S211 is a coefficient conversion process.

In step S211, a coefficient conversion unit 111 performs coefficient conversion for each image region with use of the image data. This allows a conversion coefficient to be obtained for each image region.

Specifically, the coefficient conversion unit 111 performs two-dimensional DCT for each image region. This allows a DCT coefficient to be obtained for each image region.

Step S212 is a luminance distribution extraction process.

In step S212, a luminance distribution extraction unit 121 generates luminance distribution information with use of a DC component included in a DCT coefficient of the image region for each image region, as a luminance of the image region. DC is an abbreviation for Direct Current.

Specifically, the luminance distribution extraction unit 121 generates luminance distribution information as follows.

First, the luminance distribution extraction unit 121 extracts a DC component for each image region from the DCT coefficient for each image region obtained in step S211.

Then, the luminance distribution extraction unit 121 generates a reduced image with use of the DC component for each image region as a luminance of each pixel. The generated reduced image is luminance distribution information. A pixel of the reduced image corresponds to an image region of the original image.

Figure 11:
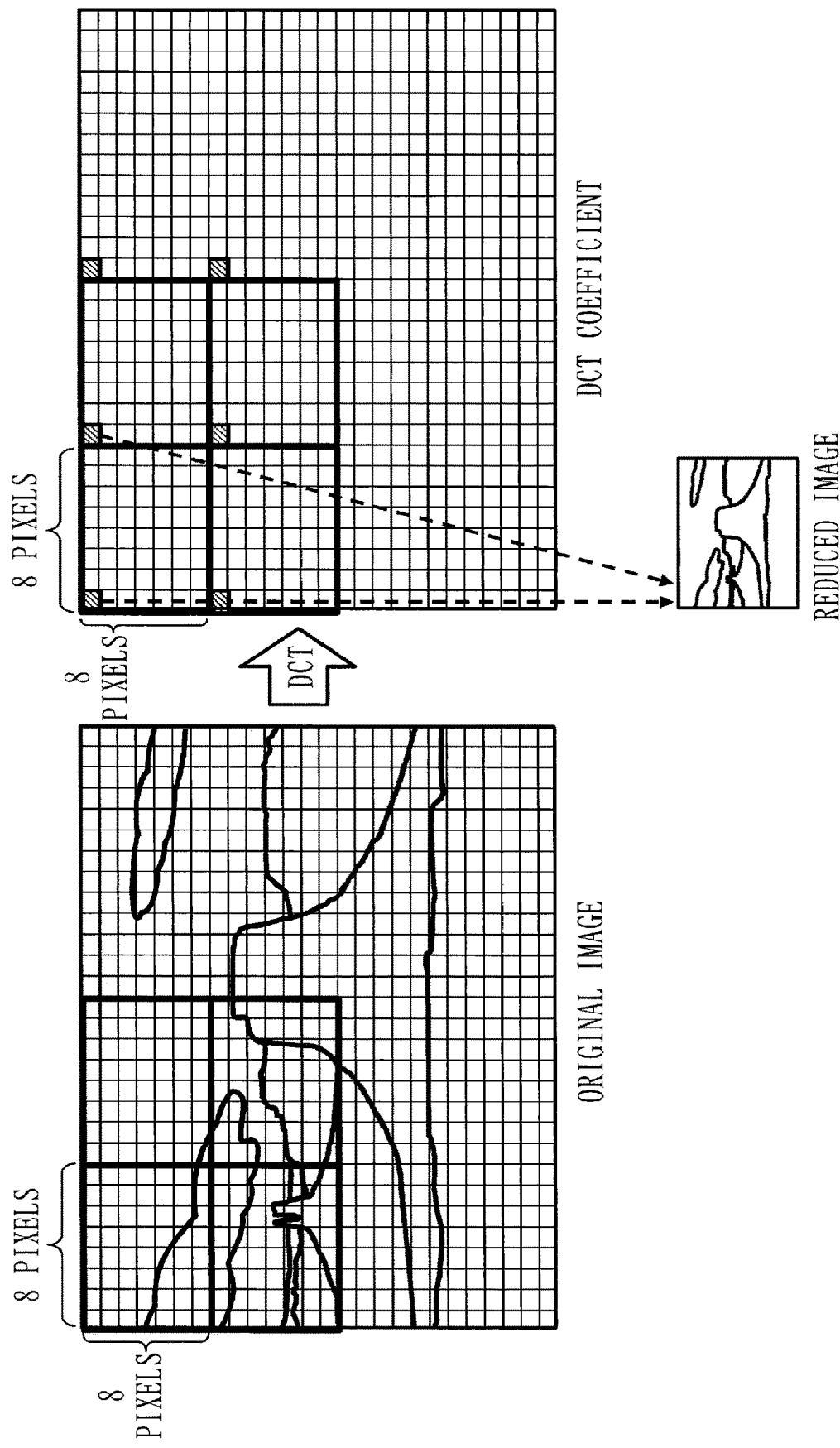
FIG. 11 is a view illustrating a relationship between an original image and a reduced image in the second embodiment.

That is, the luminance distribution extraction unit 121 generates a reduced image as illustrated in FIG. 11 as luminance distribution information.

In FIG. 11, DCT is performed on the original image for each image region of 8×8 pixel. Then, DC components for respective image regions are collected, and a reduced image of ⅛ is generated.

Step S213 is a simulated inverse quantization process.

In step S213, the simulated inverse quantization unit 124 simulates the luminance inverse quantization process by the luminance inverse quantization unit 224 of the image decoding apparatus 200.

Specifically, the simulated inverse quantization unit 124 performs quantization on the luminance distribution information and performs inverse quantization on quantized luminance distribution information. This allows inversely quantized luminance distribution information to be obtained.

More specifically, the simulated inverse quantization unit 124 performs quantization on a DC component for each image region with use of an uncorrected quantization width for the DC component. This allows a quantized DC component to be obtained for each image region. Then, the simulated inverse quantization unit 124 performs inverse quantization on a quantized DC component for each image region with use of an uncorrected quantization width for the DC component. This allows an inversely quantized DC component to be obtained for each image region.

Methods of the quantization and the inverse quantization are the same as conventional ones.

Step S214 is a correction coefficient determination process.

In step S214, a correction coefficient determination unit 122 determines a correction coefficient for each image region with use of inversely quantized luminance distribution information.

Features of the correction coefficient and a method of determining the correction coefficient are the same as those in step S113 of the image encoding method (FIG. 3) in the first embodiment.

Step S215 is a quantization width correction process.

In step S215, a quantization width correction unit 123 corrects a quantization width of an AC component with use of a correction coefficient of the image region for each image region. The AC component is a frequency component other than the DC component. AC is an abbreviation for Alternating Current.

A method of correcting the quantization width of the AC component is the same as that in step S114 of the image encoding method (FIG. 3) in the first embodiment.

Further, the quantization width correction unit 123 corrects a quantization width of the DC component by using 1 as a correction coefficient of the image region for each image region. In other words, the quantization width correction unit 123 does not correct the quantization width of the DC component.

Step S215 allows a corrected quantization width to be obtained for each image region.

Step S216 is a scalar quantization process.

In step S216, a scalar quantization unit 112 quantizes a conversion coefficient of the image region with use of a corrected quantization width for each image region. This allows a quantized conversion coefficient to be obtained for each image region. A method of the quantization is the same as a conventional one.

Step S217 is an entropy encoding process.

In step S217, an entropy encoding unit 113 performs entropy encoding on a quantized conversion coefficient for each image region. This allows compressed data to be obtained. A method of the entropy encoding is the same as a conventional one.

An image decoding method will be described with reference to FIG. 12.

It is assumed that the compressed data obtained in step S217 of the image encoding method (FIG. 10) is stored in a storage unit 291.

Step S221 is an entropy decoding process.

In step S221, an entropy decoding unit 213 performs entropy decoding on an encoded conversion coefficient for each image region with use of the compressed data. This allows a quantized conversion coefficient to be obtained for each image region. Specifically, a quantized DCT coefficient is obtained for each image region. A method of the entropy decoding is the same as a conventional one.

Step S222 is a luminance distribution extraction process.

In step S222, the luminance distribution extraction unit 223 generates luminance distribution information with use of a DC component included in a quantized DCT coefficient for each image region, as a luminance of the image region.

Figure 10:
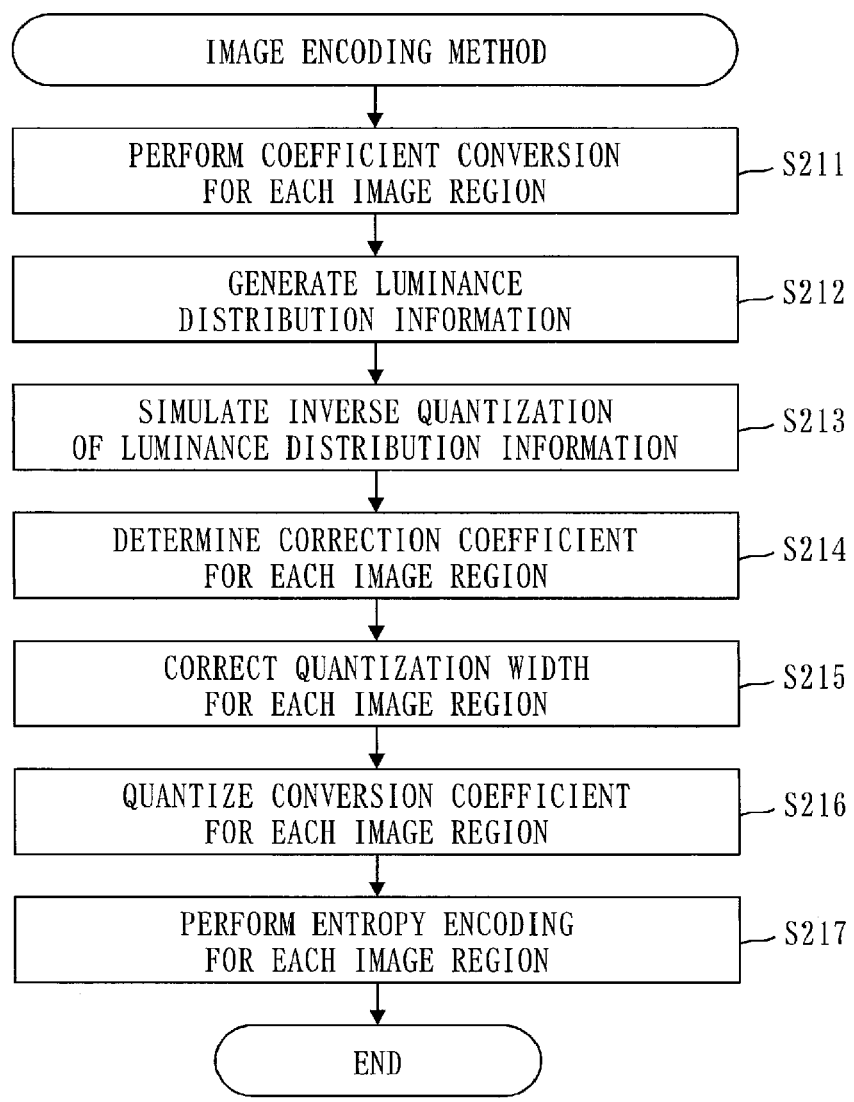
FIG. 10 is a flowchart of an image encoding method in the second embodiment.

A method of generating luminance distribution information is the same as that in step S212 of the image encoding method (FIG. 10).

Step S223 is a luminance inverse quantization process.

In step S223, the luminance inverse quantization unit 224 performs inverse quantization on the luminance distribution information.

Specifically, the luminance inverse quantization unit 224 performs inverse quantization on a quantized DC component for each image region with use of an uncorrected quantization width for the DC component. This allows an inversely quantized DC component to be obtained for each image region. A method of the inverse quantization is the same as a conventional one.

Step S224 is a correction coefficient determination process.

In step S224, a correction coefficient determination unit 221 determines a correction coefficient for each image region with use of inversely quantized luminance distribution information.

Features of the correction coefficient and a method of determining the correction coefficient are the same as those in step S113 of the image encoding method (FIG. 3) in the first embodiment.

Step S225 is a quantization width correction process.

In step S225, a quantization width correction unit 222 corrects a quantization width of an AC component with use of a correction coefficient of the image region for each image region. A method of correcting the quantization width of the AC component is the same as that in step S114 of the image encoding method (FIG. 3) in the first embodiment.

Further, the quantization width correction unit 123 corrects a quantization width of the DC component by using 1 as a correction coefficient of the image region for each image region. In other words, the quantization width correction unit 123 does not correct the quantization width of the DC component.

Step S225 allows a corrected quantization width to be obtained for each image region.

Step S226 is a scalar inverse quantization process.

In step S226, a scalar inverse quantization unit 212 inversely quantizes a quantized conversion coefficient with use of a corrected quantization width for each image region. This allows a conversion coefficient of the image region to be obtained for each image region. A method of the inverse quantization is the same as a conventional one.

Step S227 is a coefficient inverse conversion process.

In step S227, a coefficient inverse conversion unit 211 performs coefficient inverse conversion on a conversion coefficient of the image region for each image region. Specifically, the coefficient inverse conversion unit 211 performs two-dimensional inverse DCT for each image region. This allows image data including a decoded image to be obtained.

* Effect of Second Embodiment *

The DC component to be used for generating luminance distribution information is transmitted as compressed data after entropy encoding and restored by entropy decoding. Therefore, generating luminance distribution information with use of an entropy-decoded DC component eliminates necessity of transmission of the luminance distribution information from the image encoding apparatus 100 to the image decoding apparatus 200. That is, since information requiring transmission is reduced, it is possible to achieve an effect similar to improvement of compression efficiency.

However, in a situation where the DC component is also quantized by scalar quantization, it is necessary to generate same correction coefficients in each of the image encoding apparatus 100 and the image decoding apparatus 200 in order to correctly decode an image.

Therefore, the image encoding apparatus 100 performs quantization without changing the quantization width by setting the correction coefficient to 1 for the DC component. Similarly, the image decoding apparatus 200 performs inverse quantization without changing the quantization width by setting the correction coefficient to 1 for the DC component.

Further, the image encoding apparatus 100 performs quantization and performs inverse quantization on a DC component extracted as luminance distribution information with use of an uncorrected quantization width, determines a correction coefficient on the basis of an inversely quantized DC component, and corrects a quantization width.

On the other hand, the image decoding apparatus 200 obtains a quantized DCT coefficient through entropy decoding, and extracts a DC component from the quantized DCT coefficient. This allows the same information to be obtained as the luminance distribution information obtained by the image encoding apparatus 100. Then, the image decoding apparatus 200 performs inverse quantization on an extracted DC component with use of an uncorrected quantization width. This allows an image decoding apparatus 200 to obtain the same correction coefficient as the correction coefficient determined by the image encoding apparatus 100.

* Other Configuration *

The respective quantization width correction units (123, 222) of the image encoding apparatus 100 and the image decoding apparatus 200 may correct a quantization width of the DC component without setting a correction coefficient to 1. That is, the quantization width correction unit (123, 222) may change the quantization width of the DC component by correction, similarly to the first embodiment.

In that case, the image encoding apparatus 100 may not include the simulated inverse quantization unit 124, and the image decoding apparatus 200 may not include the luminance inverse quantization unit 224.

That is, the image encoding apparatus 100 may not perform step S213 of the image encoding method (FIG. 10). In that case, in step S214, the correction coefficient is determined for each image region with use of the luminance distribution information generated in step S212.

Figure 12:
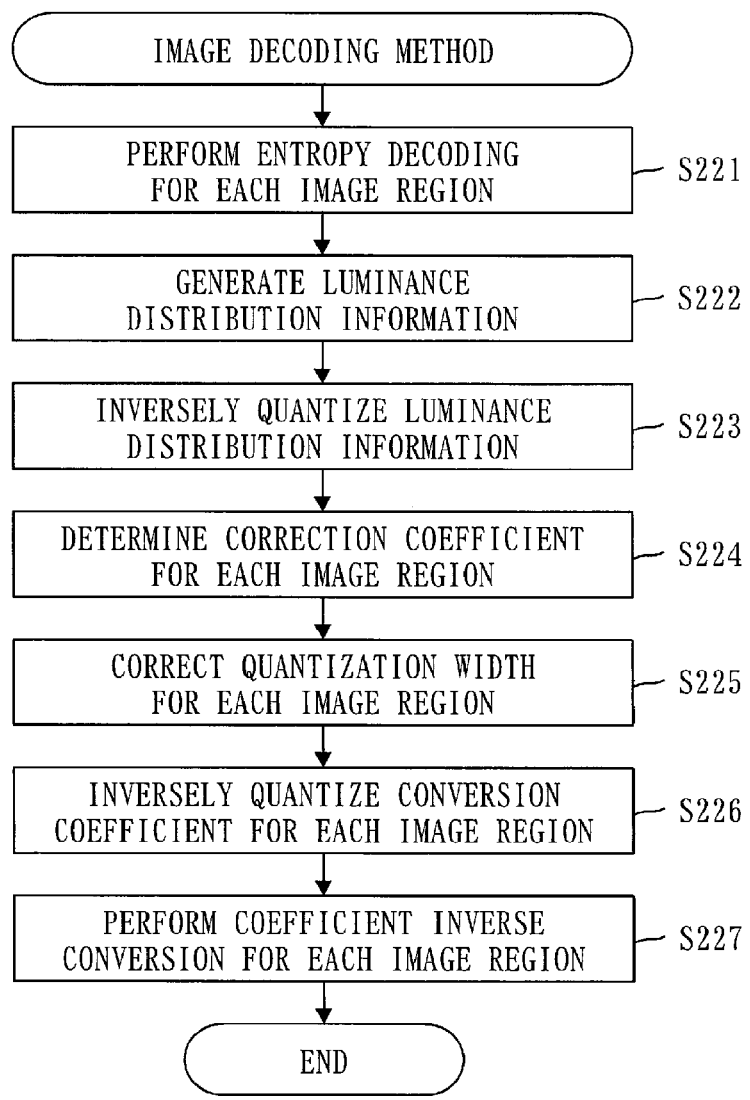
FIG. 12 is a flowchart of an image decoding method in the second embodiment.

Further, the image decoding apparatus 200 may not perform step S223 of the image decoding method (FIG. 12). In that case, in step S224, the correction coefficient is determined for each image region with use of the luminance distribution information generated in step S222.

It can be said that an influence on a compression performance is small in a case where the DC component is not quantized, because the quantization width is typically small since an error of the DC component is easily perceived by human eyes, and a data amount is small since the DC component corresponds to a reduced image. If the simulated inverse quantization unit 124 and the luminance inverse quantization unit 224 become unnecessary, the compression performance slightly decreases, but a calculation amount can be significantly reduced.

The second embodiment may be applied to either a monochrome image or a color image, similarly to the first embodiment.

Figure 8:
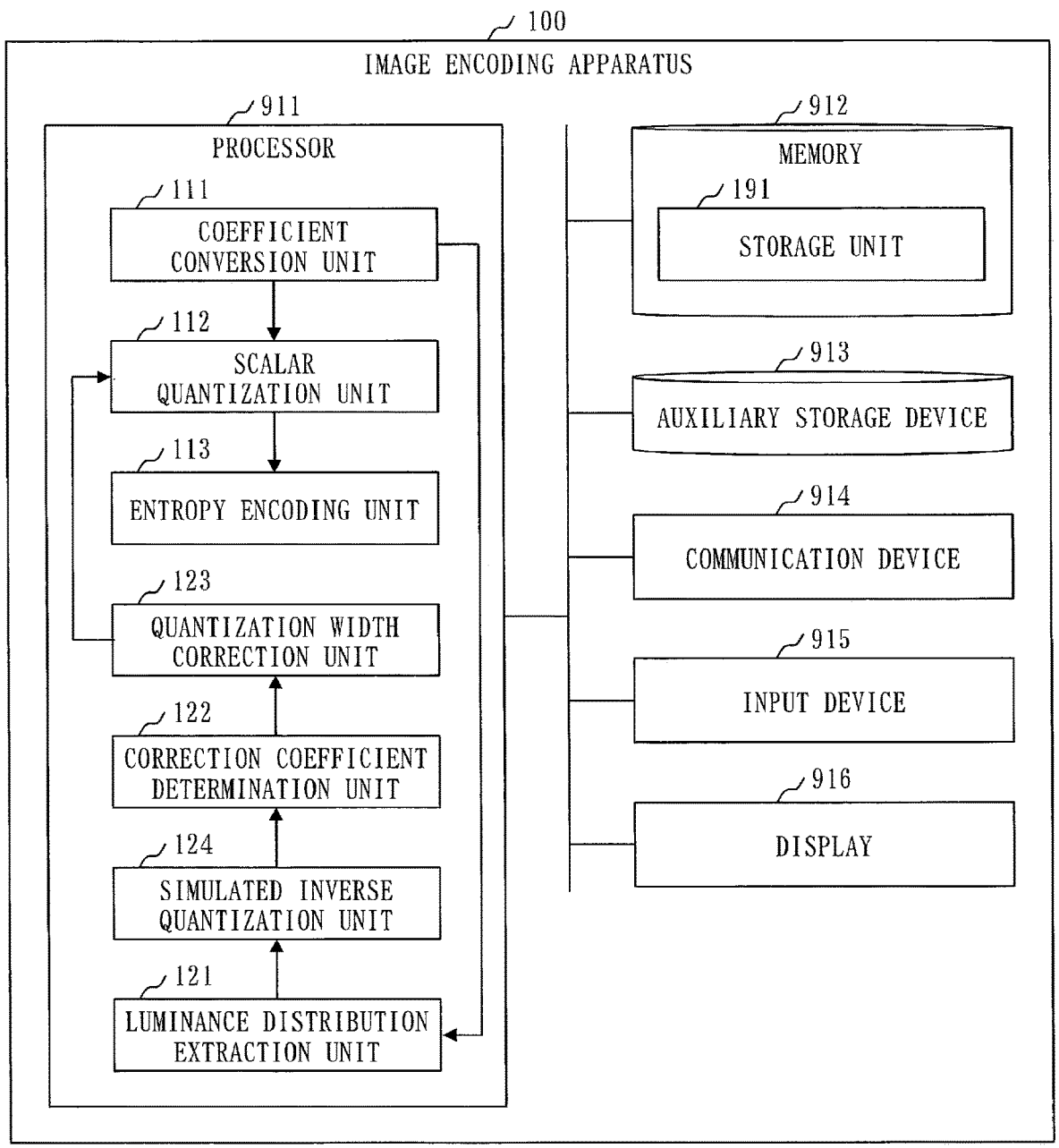
FIG. 8 is a configuration diagram of an image encoding apparatus 100 in a second embodiment.
Figure 9:
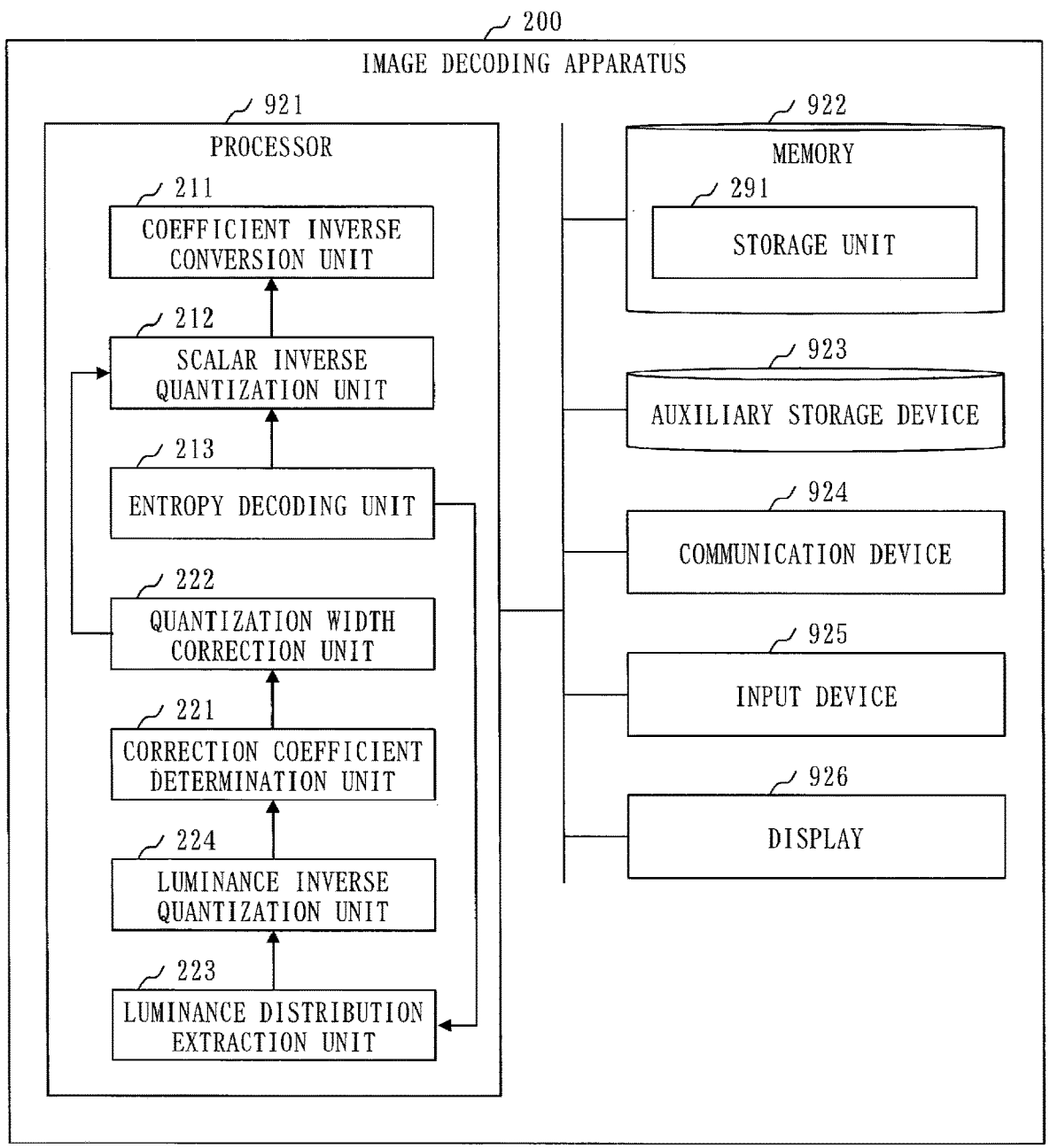
FIG. 9 is a configuration diagram of an image decoding apparatus 200 in the second embodiment.

The configuration of the image encoding apparatus 100 illustrated in FIG. 8 and the configuration of the image decoding apparatus 200 illustrated in FIG. 9 are configurations suitable for a monochrome image.

Figure 13:
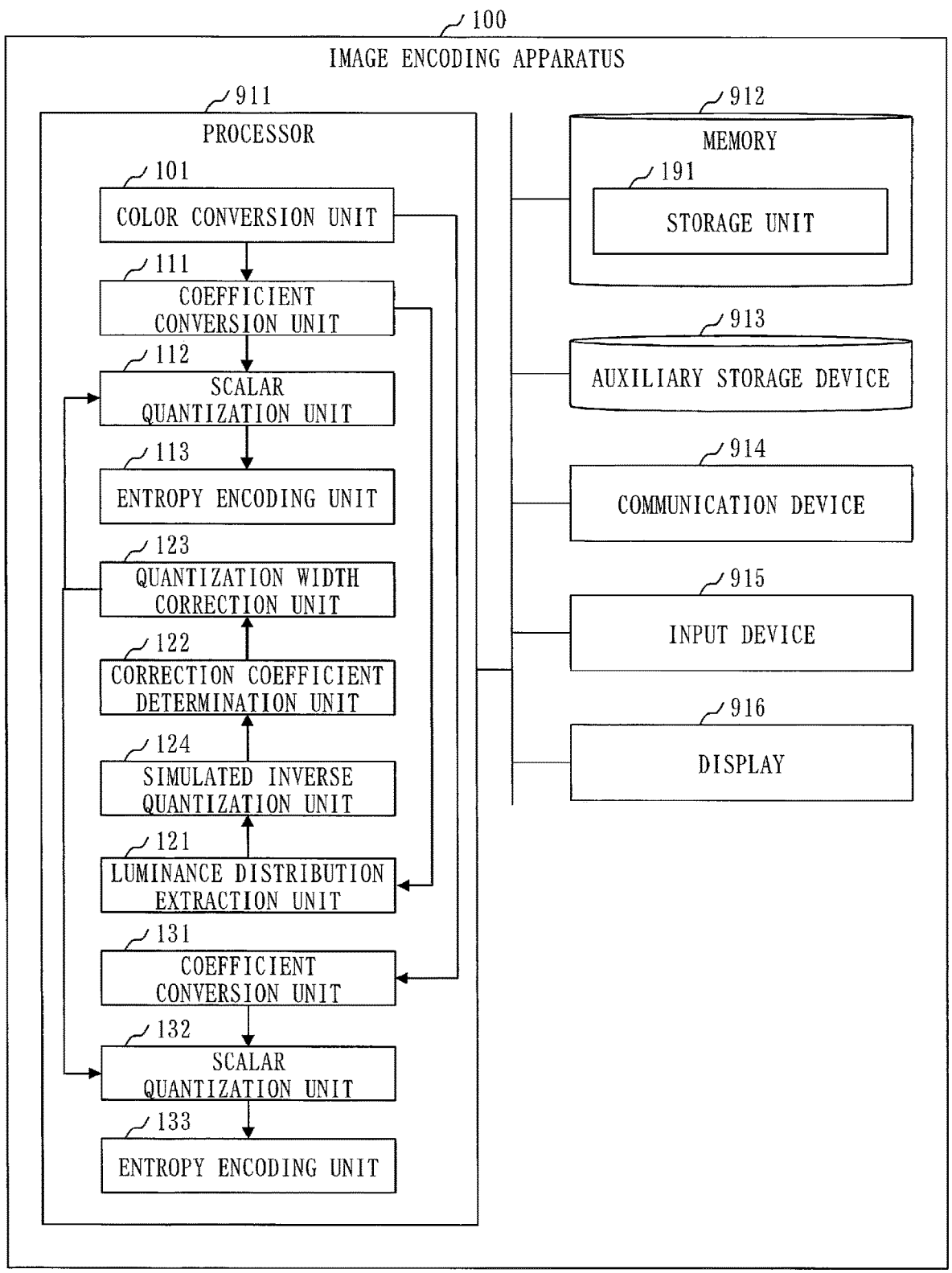
FIG. 13 is another configuration diagram of the image encoding apparatus 100 in the second embodiment.

A configuration of the image encoding apparatus 100 suitable for a color image will be described with reference to FIG. 13.

In addition to the elements of the functional configuration illustrated in FIG. 8, the image encoding apparatus 100 includes a color conversion unit 101, a coefficient conversion unit 131, a scalar quantization unit 132, and an entropy encoding unit 133.

Figure 14:
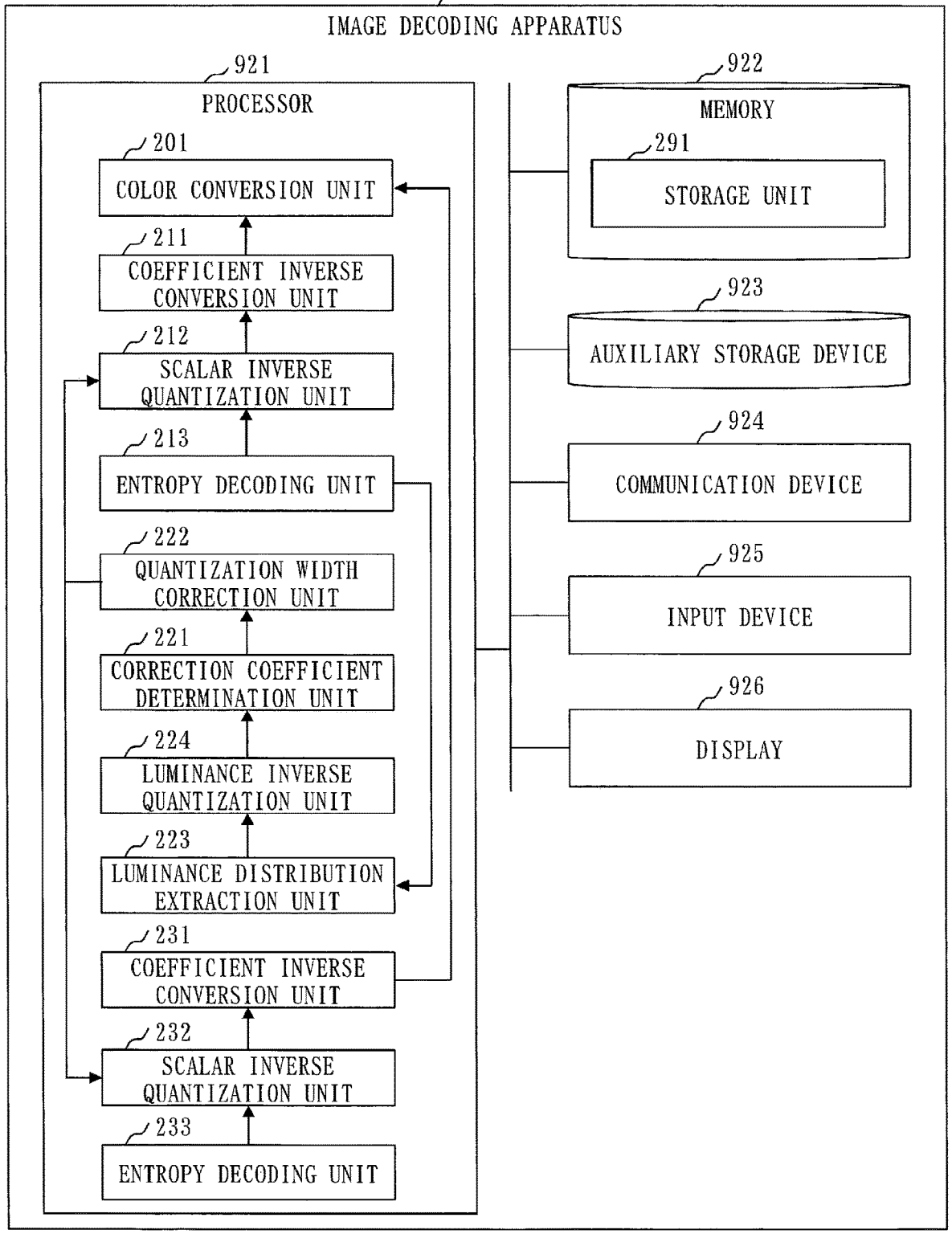
FIG. 14 is another configuration diagram of the image decoding apparatus 200 in the second embodiment.

A configuration of the image decoding apparatus 200 suitable for a color image will be described with reference to FIG. 14.

In addition to the elements of the functional configuration illustrated in FIG. 9, the image decoding apparatus 200 includes the color conversion unit 201, a coefficient conversion unit 231, a scalar inverse quantization unit 232, and an entropy decoding unit 233.

Third Embodiment

Points that are different from the first embodiment as to an aspect of performing post quantization instead of scalar quantization will be mainly described with reference to FIGS. 15 to 19.

* Description of Configuration *

A configuration of an image encoding apparatus 300 for encoding an image will be described with reference to FIG. 15.

The image encoding apparatus 300 is a computer including hardware such as a processor 931, a memory 932, an auxiliary storage device 933, a communication device 934, an input device 935, and a display 936. These pieces of hardware are connected to each other via a signal line.

The processor 931, the memory 932, the auxiliary storage device 933, the communication device 934, the input device 935, and the display 936 are hardware similar to the hardware included in the image encoding apparatus 100 in the first embodiment.

The image encoding apparatus 300 includes "units" such as a coefficient conversion unit 311, an entropy encoding unit 312, a post quantization unit 313, a luminance distribution extraction unit 321, a correction coefficient determination unit 322, and a conversion coefficient correction unit 323, as elements of a functional configuration. In the description of FIG. 15, the "unit" means an element of a functional configuration provided to the image encoding apparatus 300.

A function of the "unit" is realized by software. The function of the "unit" will be described later.

In the auxiliary storage device 933, a program for realizing the function of the "unit" is stored. The program for realizing the function of the "unit" is loaded into the memory 932 and executed by the processor 931.

Data obtained by executing the program for realizing the function of the "unit" is stored in a storage device such as the memory 932, the auxiliary storage device 933, a register in the processor 931, or a cache memory in the processor 931.

The memory 932 functions as a storage unit 391 that stores data to be used in the image encoding apparatus 300. However, another storage device may function as the storage unit 391.

The communication device 934 functions as a communication unit that communicates data. In the communication device 934, the receiver functions as a reception unit that receives data, and the transmitter functions as a transmission unit that transmits data.

The input device 935 functions as an acceptance unit that accepts an input.

The display 936 functions as a display unit that displays images and the like.

The image encoding apparatus 300 may include a plurality of processors substituting for the processor 931. The plurality of processors share execution of the program for realizing the function of the "unit".

The program for realizing the function of "unit" can be stored in a non-volatile storage medium in a computer readable manner. The non-volatile storage medium is a non-transitory tangible medium.

The "unit" may be replaced with "process" or "step". The function of "unit" may be realized by firmware.

A configuration of an image decoding apparatus 400 for decoding an image will be described with reference to FIG. 16.

The image decoding apparatus 400 is a computer including hardware such as a processor 941, a memory 942, an auxiliary storage device 943, a communication device 944, an input device 945, and a display 946. These pieces of hardware are connected to each other via a signal line.

The processor 941, the memory 942, the auxiliary storage device 943, the communication device 944, the input device 945, and the display 946 are hardware similar to the hardware included in the image encoding apparatus 100 in the first embodiment.

The image decoding apparatus 400 includes "units" such as a coefficient inverse conversion unit 411, an entropy decoding unit 412, a correction coefficient determination unit 421, and a conversion coefficient inverse correction unit 422, as elements of a functional configuration. In the description of FIG. 16, the "unit" means an element of a functional configuration provided to the image decoding apparatus 400.

A function of the "unit" is realized by software. The function of the "unit" will be described later.

In the auxiliary storage device 943, a program for realizing the function of the "unit" is stored. The program for realizing the function of the "unit" is loaded into the memory 942 and executed by the processor 941.

Data obtained by executing the program for realizing the function of the "unit" is stored in a storage device such as the memory 942, the auxiliary storage device 943, a register in the processor 941, or a cache memory in the processor 941.

The memory 942 functions as a storage unit 491 that stores data to be used in the image decoding apparatus 400. However, another storage device may function as the storage unit 491.

The communication device 944 functions as a communication unit that communicates data. In the communication device 944, the receiver functions as a reception unit that receives data, and the transmitter functions as a transmission unit that transmits data.

The input device 945 functions as an acceptance unit that accepts an input.

The display 946 functions as a display unit that displays images and the like.

The image decoding apparatus 400 may include a plurality of processors substituting for the processor 941. The plurality of processors share execution of the program for realizing the function of the "unit".

The program for realizing the function of "unit" can be stored in a non-volatile storage medium in a computer readable manner. The non-volatile storage medium is a non-transitory tangible medium.

The "unit" may be replaced with "process" or "step". The function of "unit" may be realized by firmware.

* Description of Operation *

An operation of the image encoding apparatus 300 corresponds to an image encoding method. Further, a procedure of the image encoding method corresponds to a procedure of an image encoding program.

An operation of the image decoding apparatus 400 corresponds to an image decoding method. Further, a procedure of the image decoding method corresponds to a procedure of an image decoding program.

The image encoding method will be described with reference to FIG. 17.

It is assumed that image data including an image is stored in a storage unit 191.

Step S311 is a coefficient conversion process.

In step S311, the coefficient conversion unit 311 performs coefficient conversion on an image with use of the image data. This allows conversion coefficients of the image to be obtained.

Specifically, the coefficient conversion unit 311 performs two-dimensional DWT on the image. This allows a DWT coefficient to be obtained for each frequency component. More specifically, respective DWT coefficients of an LL component, an HL component, an LH component, and an HH component are obtained. DWT is an abbreviation for Discrete Wavelet Conversion. The DWT coefficient is a coefficient for each pixel.

Step S312 is a luminance distribution extraction process.

In step S312, the luminance distribution extraction unit 321 generates luminance distribution information with use of the image data. The luminance distribution information indicates a luminance of each image region.

Step S313 is a correction coefficient determination process.

In step S313, the correction coefficient determination unit 322 determines a correction coefficient for each image region with use of the luminance distribution information.

That is, the correction coefficient determination unit 122 determines a correction coefficient on the basis of a luminance of the image region for each image region.

The correction coefficient is a value to be used for correcting a conversion coefficient of the image region.

Each correction coefficient is a value to divide a conversion coefficient of the image region, and is larger as the image region is brighter and smaller as the image region is darker. That is, each correction coefficient is larger than a correction coefficient of an image region that is darker than the image region, and smaller than a correction coefficient of an image region that is brighter than the image region.

In addition, each correction coefficient has the following feature (1) or (2).

(1) Each correction coefficient is proportional to a luminance of the image region. That is, a ratio of the correction coefficient of the image region to a correction coefficient of another image region corresponds to a ratio of the luminance of the image region to a luminance of the another image region.

(2) Each correction coefficient is proportional to the ½ power of the luminance of the image region. ½ means one-half. That is, a ratio of the correction coefficient of the image region to a correction coefficient of another image region corresponds to a ratio of the ½ power of the luminance of the image region to the ½ power of a luminance of the another image region.

The correction coefficient determination unit 322 may determine the correction coefficient for each image region through any procedure.

For example, the correction coefficient determination unit 322 may calculate a correction coefficient corresponding to a luminance of an image region by calculating a predefined expression, or may acquire a correction coefficient corresponding to a luminance of an image region from a predefined table.

Step S314 is a conversion coefficient correction process.

In step S314, the conversion coefficient correction unit 323 corrects a conversion coefficient of an image region with use of a correction coefficient of the image region for each image region. This allows a corrected conversion coefficient to be obtained for each image region.

The corrected conversion coefficient is smaller as the image region is brighter and larger as the image region is darker.

Specifically, the conversion coefficient correction unit 323 calculates a corrected quantization width by calculating the following expression.

$$\text{Coeff}_{correct} = \text{Coeff} \times (\Delta q_{lum\_max} / \Delta q_{lum})$$

$\text{Coeff}_{correct}$ is a corrected conversion coefficient.

Coeff is an uncorrected conversion coefficient.

$\Delta q_{lum\_max}$ is a correction coefficient corresponding to a maximum luminance.

$\Delta q_{lum}$ is a correction coefficient.

It should be noted that, a relationship $\text{Coeff}_{correct} \geq \text{Coeff}$ is satisfied since a relationship of $\Delta q_{lum} \leq \Delta q_{lum\_max}$ is satisfied.

Step S315 is an entropy encoding process.

In step S315, the entropy encoding unit 312 performs entropy encoding on corrected conversion coefficients of the image. This allows encoded conversion coefficients of the image to be obtained. A method of the entropy encoding is the same as a conventional one.

Step S316 is a post quantization process.

In step S316, the post quantization unit 313 quantizes encoded conversion coefficients of the image. This allows compressed data to be obtained. The compressed data is data including quantized conversion coefficients of the image. A method of the quantization is the same as a conventional one.

Figure 18:
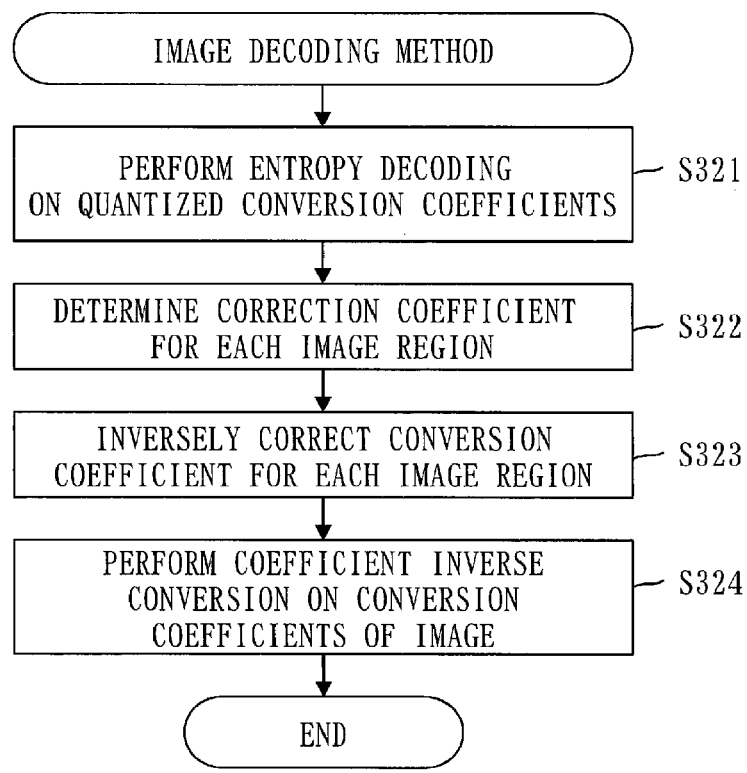
FIG. 18 is a flowchart of an image decoding method in the third embodiment.

The image decoding method will be described with reference to FIG. 18.

It is assumed that the compressed data obtained in step S316 of the image encoding method (FIG. 17) is stored in the storage unit 491.

Further, it is assumed that the luminance distribution information obtained in step S312 of the image encoding method (FIG. 17) is stored in the storage unit 491.

Step S321 is an entropy decoding process.

In step S321, the entropy decoding unit 412 performs entropy decoding on quantized conversion coefficients of the image with use of the compressed data. This allows decoded conversion coefficients of the image to be obtained. Specifically, decoded DWT coefficients of the image is obtained. A method of the entropy decoding is the same as a conventional one.

Step S322 is a correction coefficient determination process.

In step S322, the correction coefficient determination unit 421 determines a correction coefficient for each image region with use of the luminance distribution information.

That is, a correction coefficient determination unit 221 determines a correction coefficient on the basis of a luminance of the image region for each image region.

Figure 17:
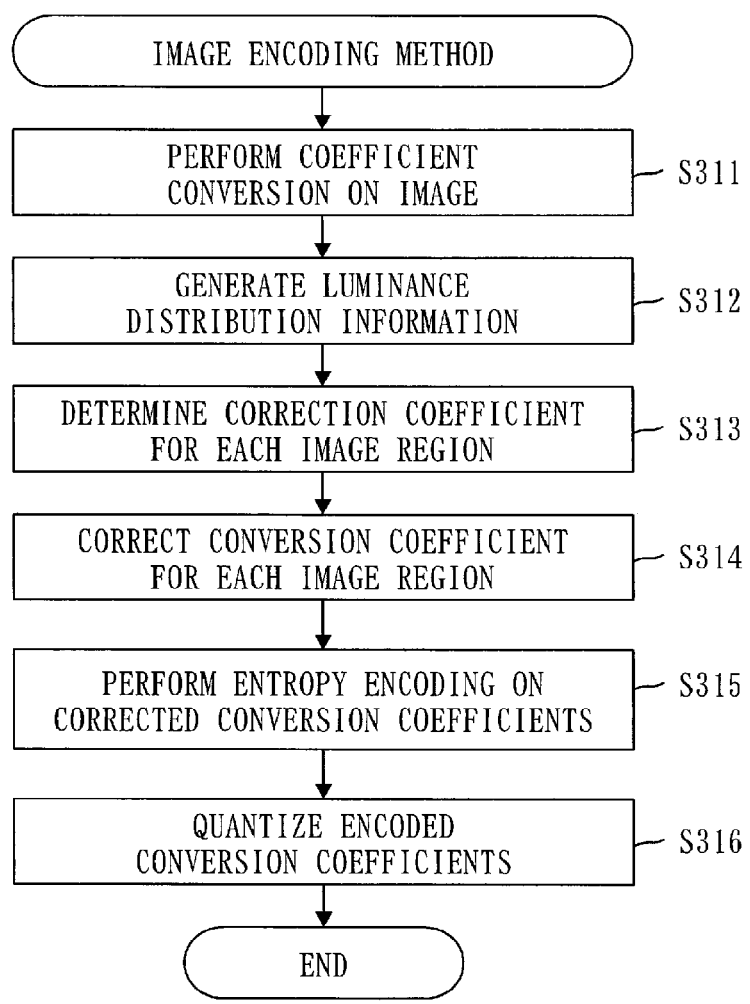
FIG. 17 is a flowchart of an image encoding method in the third embodiment.

Features of the correction coefficient and a method of determining the correction coefficient are the same as those in step S313 of the image encoding method (FIG. 17).

Step S323 is a conversion coefficient inverse correction process.

In step S323, the conversion coefficient inverse correction unit 422 inversely corrects a decoded conversion coefficient with use of a correction coefficient of the image region for each image region. This allows a conversion coefficient of the image region to be obtained for each image region.

More specifically, the conversion coefficient inverse correction unit 422 calculates a conversion coefficient of the image region by calculating the following equation.

$$\text{Coeff}_{quant} = \text{Coeff}_{correct\_quant} \times (\Delta q_{lum} / \Delta q_{lum\_max})$$

Coeff$_{quant}$ is an inversely corrected conversion coefficient.

Coeff$_{correct\_quant}$ is a conversion coefficient before inverse correction, that is, a decoded conversion coefficient.

It should be noted that Coeff$_{correct\_quant}$ is the same as Coeff$_{correct}$ after being quantized in step S316 of the image encoding method (FIG. 17).

Further, a relationship Coeff$_{quant}$≤Coeff$_{correct\_quant}$ is satisfied since a relationship of $\Delta q_{lum} \leq \Delta q_{lum\_max}$ is satisfied.

Step S324 is a coefficient inverse conversion process.

In step S324, the coefficient inverse conversion unit 411 performs coefficient inverse conversion on a conversion coefficient of the image. Specifically, the coefficient inverse conversion unit 411 performs two-dimensional inverse DWT on DWT coefficients of the image. This allows image data including a decoded image to be obtained.

* Effect of Third Embodiment *

Figure 19:
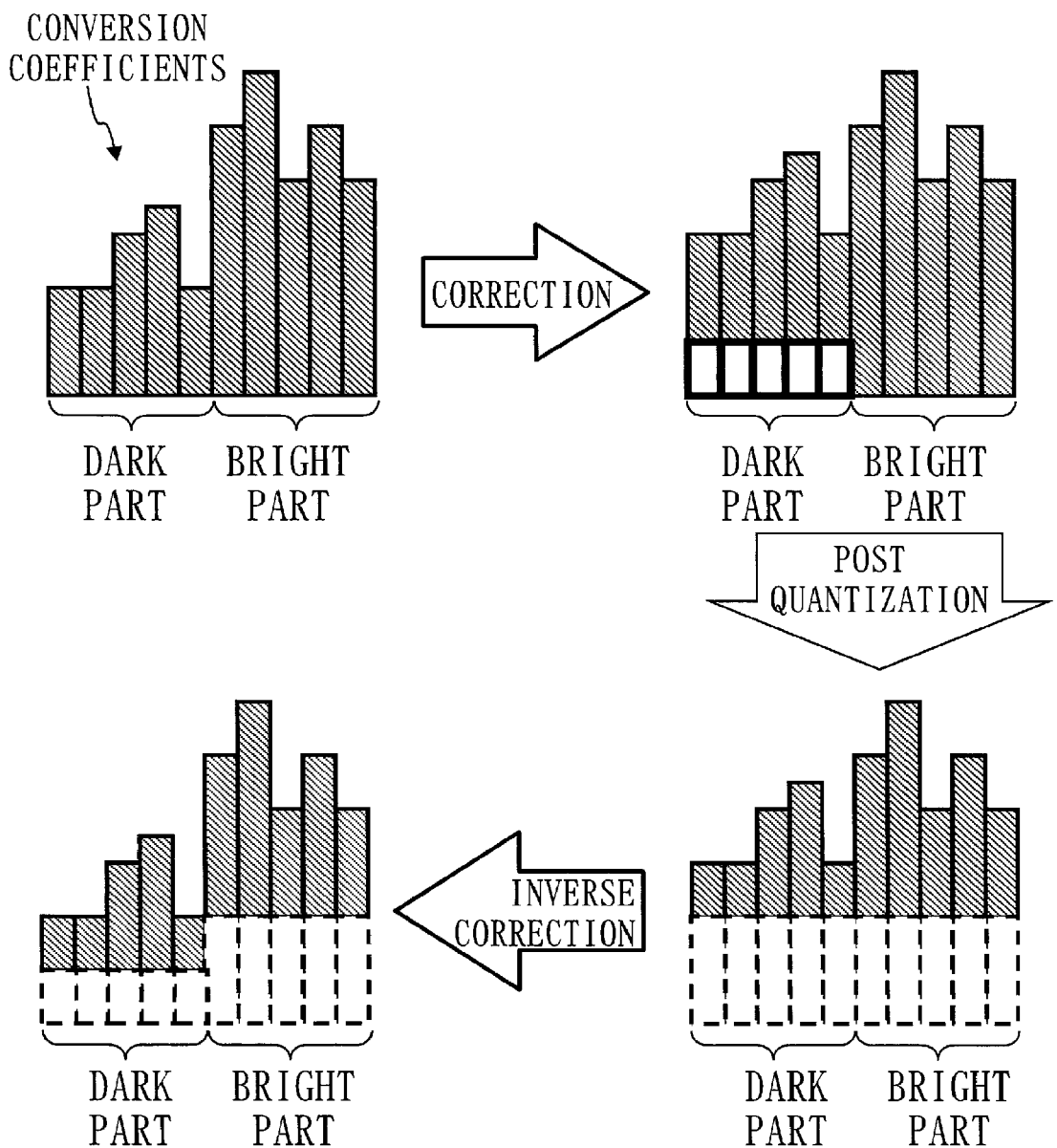
FIG. 19 is a view illustrating a relationship of conversion coefficients in the third embodiment.

As illustrated in FIG. 19, a conversion coefficient of a darker part is more greatly corrected. Then, post quantization is performed on entropy-encoded conversion coefficients. After that, an entropy-decoded conversion coefficient is inversely corrected. As a result, the quantization width is substantially controlled so as to be small in a dark part and large in a bright part. Therefore, the same effect as that of the first embodiment is exerted.

* Other Configuration * The third embodiment may be applied to either a monochrome image or a color image.

Figure 15:
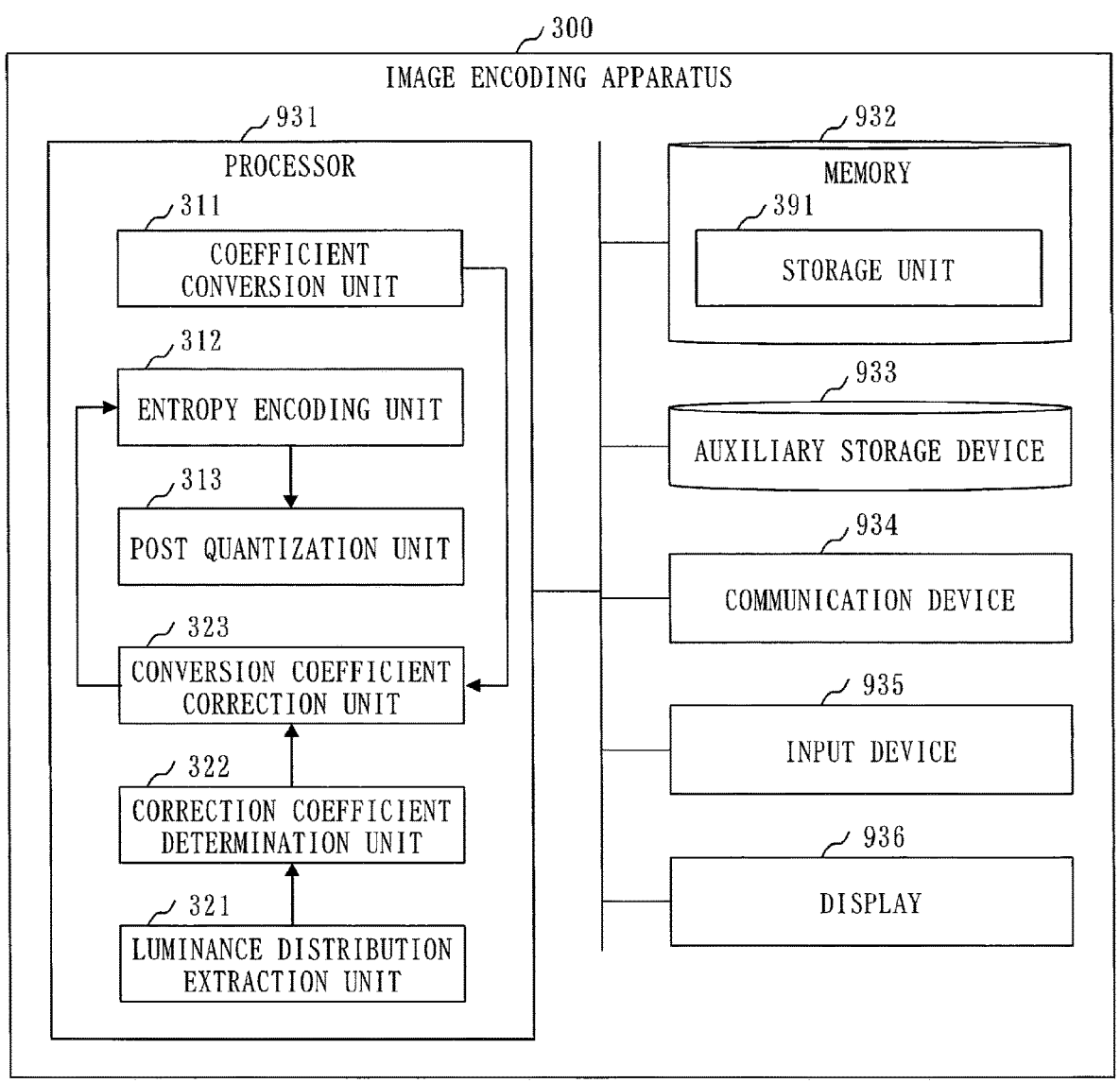
FIG. 15 is a configuration diagram of an image encoding apparatus 300 in a third embodiment.
Figure 16:
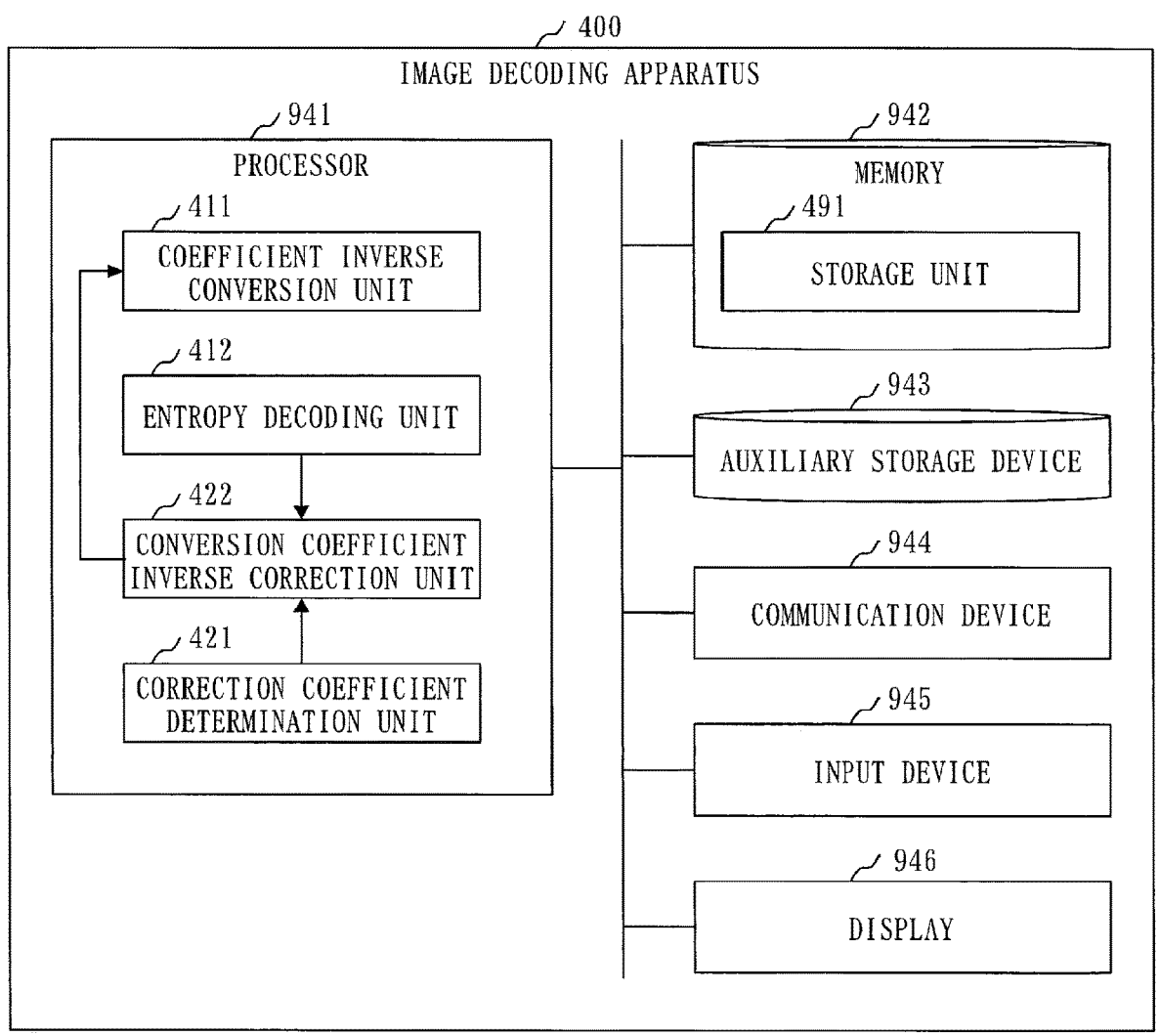
FIG. 16 is a configuration diagram of an image decoding apparatus 400 in the third embodiment.

The configuration of the image encoding apparatus 300 illustrated in FIG. 15 and the configuration of the image decoding apparatus 400 illustrated in FIG. 16 are configurations suitable for a monochrome image.

Figure 20:
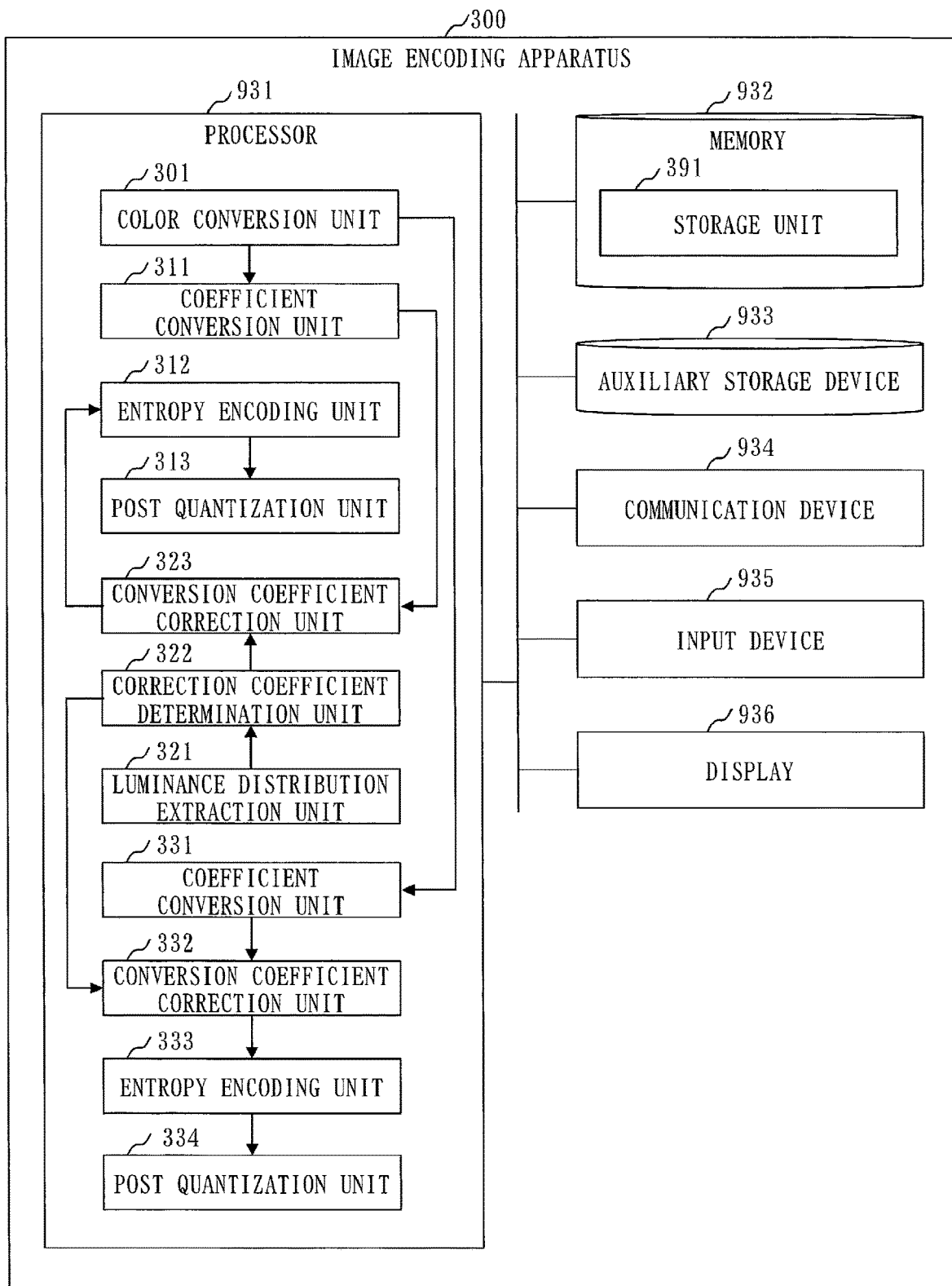
FIG. 20 is another configuration diagram of the image encoding apparatus 300 in the third embodiment.

A configuration of the image encoding apparatus 300 suitable for a color image will be described with reference to FIG. 20.

In addition to the elements of the functional configuration illustrated in FIG. 15, the image encoding apparatus 300 includes a color conversion unit 301, a coefficient conversion unit 331, a conversion coefficient correction unit 332, an entropy encoding unit 333, and a post quantization unit 334.

The color conversion unit 301 converts image data of a color image into luminance image data and color difference image data. Specifically, RGB format image data is converted into YUV format image data. Y format image data is the luminance image data and UV format image data is the color difference image data.

The coefficient conversion unit 311, the conversion coefficient correction unit 323, the entropy encoding unit 312, and the post quantization unit 313 perform processing on luminance image data.

The coefficient conversion unit 331, the conversion coefficient correction unit 332, the entropy encoding unit 333, and the post quantization unit 334 perform processing on color difference image data.

Figure 21:
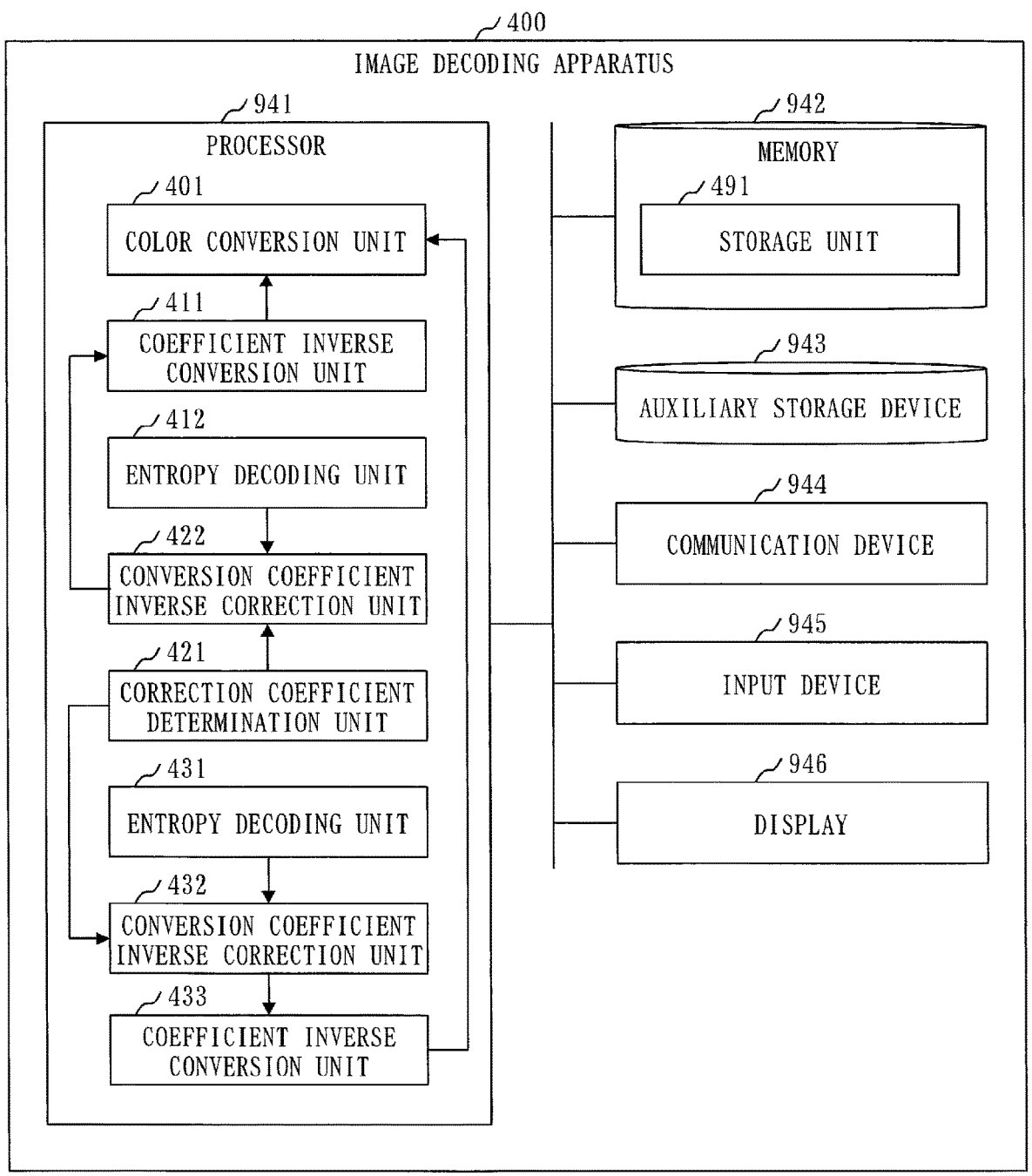
FIG. 21 is another configuration diagram of the image decoding apparatus 400 in the third embodiment.

A configuration of the image decoding apparatus 400 suitable for a color image will be described with reference to FIG. 21.

In addition to the elements of the functional configuration illustrated in FIG. 16, the image decoding apparatus 400 includes a color conversion unit 401, an entropy decoding unit 431, a conversion coefficient inverse correction unit 432, and a coefficient inverse conversion unit 433.

The color conversion unit 401 converts luminance image data and color difference image data into image data of a color image. Specifically, YUV format image data is converted into RGB format image data.

The entropy decoding unit 412, the conversion coefficient inverse correction unit 422, and the coefficient inverse conversion unit 411 perform processing on luminance image data.

The entropy decoding unit 431, the conversion coefficient inverse correction unit 432, and the coefficient inverse conversion unit 433 perform processing on color difference image data.

Similarly to the image encoding apparatus 300, the image decoding apparatus 400 may include a luminance distribution extraction unit 321.

One computer may have the functional configuration of the image encoding apparatus 300 and the functional configuration of the image decoding apparatus 400. The computer including the functional configuration of the image encoding apparatus 300 and the functional configuration of the image decoding apparatus 400 is referred to as an image processing apparatus. Similarly to the image encoding apparatus 300 and the image decoding apparatus 400, the image processing apparatus includes hardware such as a processor, a memory, an auxiliary storage device, a communication device, an input device, and a display. An operation of the image processing apparatus corresponds to an image processing method, and a procedure of the image processing method corresponds to a procedure of an image processing program.

Fourth Embodiment

Points that are different from the third embodiment as to an aspect of generating luminance distribution information with use of a conversion coefficient will be mainly described with reference to FIGS. 22 to 26.

* Description of Configuration *

A configuration of an image encoding apparatus 300 will be described with reference to FIG. 22.

The image encoding apparatus 300 includes a simulated quantization unit 324 in addition to the elements of the functional configuration illustrated in FIG. 15 in the third embodiment. A function of the simulated quantization unit 324 will be described later.

A configuration of an image decoding apparatus 400 will be described with reference to FIG. 23.

The image decoding apparatus 400 includes a luminance distribution extraction unit 423 in addition to the elements of the functional configuration illustrated in FIG. 16 in the third embodiment. A function of the luminance distribution extraction unit 423 will be described later.

An image encoding method will be described with reference to FIG. 24.

It is assumed that image data including an image is stored in a storage unit 391.

Step S411 is a coefficient conversion process.

In step S411, a coefficient conversion unit 311 performs coefficient conversion on an image with use of the image data. This allows a conversion coefficient of the image to be obtained.

Specifically, the coefficient conversion unit 311 performs two-dimensional DWT on the image. This allows a DWT coefficient to be obtained for each frequency component.

Step S412 is a luminance distribution extraction process.

In step S412, a luminance distribution extraction unit 321 generates luminance distribution information with use of a DWT coefficient.

Specifically, the luminance distribution extraction unit 321 generates luminance distribution information including a highest-order LL component as a reduced image. A pixel of the reduced image corresponds to an image region of the original image.

In a case where DWT is performed twice, the luminance distribution extraction unit 321 generates luminance distribution information including a 2LL component as a reduced image.

Figure 25:
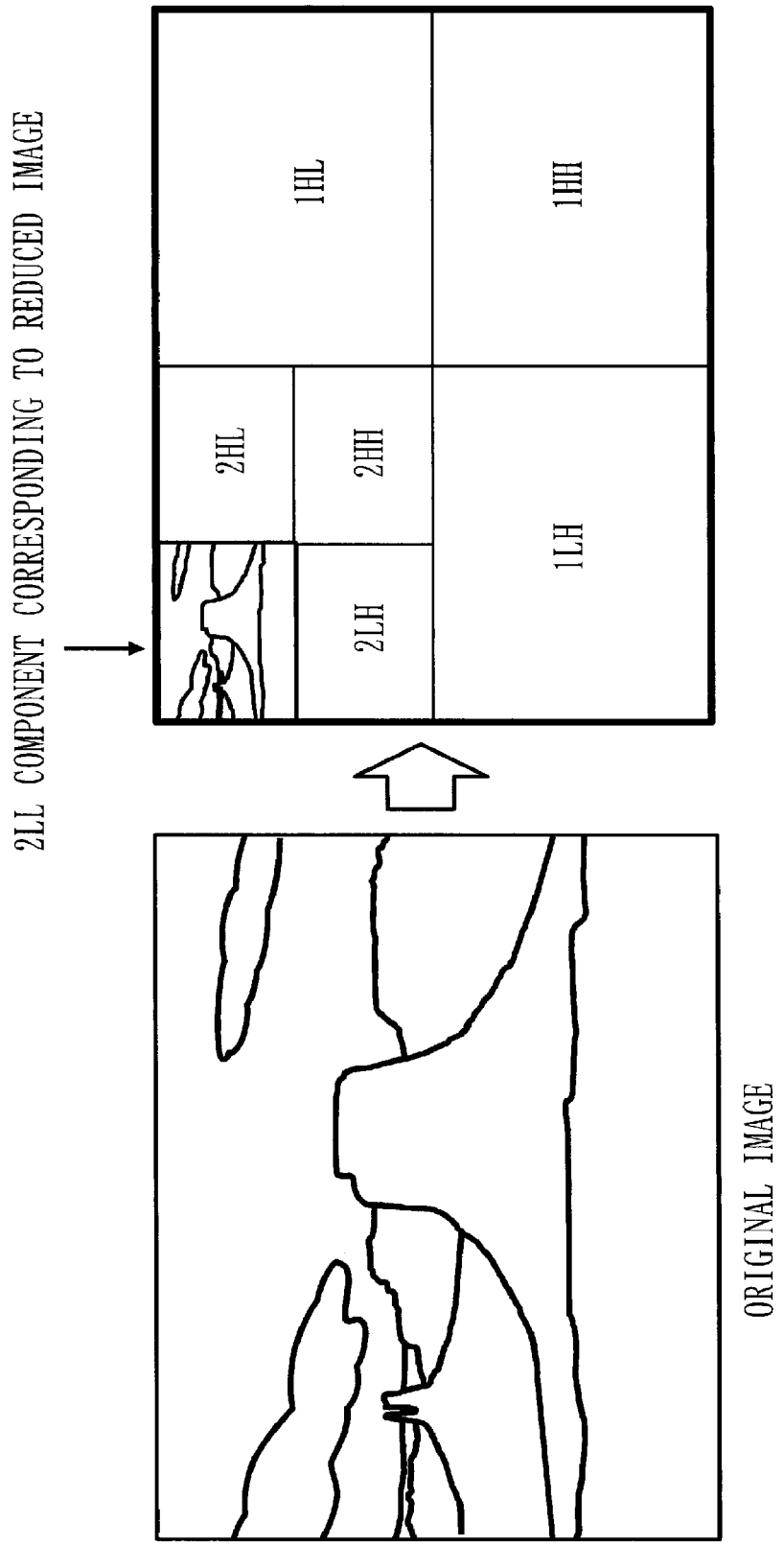
FIG. 25 is a view showing a relationship between an original image and a reduced image in the fourth embodiment.

FIG. 25 illustrates a relationship between the original image and the 2LL component corresponding to the reduced image.

Step S413 is a simulated quantization process.

In step S413, the simulated quantization unit 324 simulates a post quantization process by a post quantization unit 313.

Specifically, the simulated quantization unit 324 performs quantization on the luminance distribution information and performs inverse quantization on quantized luminance distribution information. This allows inversely quantized luminance distribution information to be obtained.

More specifically, the simulated quantization unit 324 performs quantization on the highest-order LL component with use of an uncorrected quantization width. This allows a quantized LL component to be obtained. Then, the simulated quantization unit 324 performs inverse quantization on the quantized LL component with use of an uncorrected quantization width. This allows an inversely quantized LL component to be obtained.

Methods of the quantization and the inverse quantization are the same as conventional ones.

Step S414 is a correction coefficient determination process.

In step S414, a correction coefficient determination unit 322 determines a correction coefficient for each image region with use of inversely quantized luminance distribution information.

Features of the correction coefficient and a method of determining the correction coefficient are the same as those in step S313 of the image encoding method (FIG. 17) in the third embodiment.

Step S415 is a conversion coefficient correction process.

In step S415, a conversion coefficient correction unit 323 corrects a conversion coefficient of a high frequency component with use of a correction coefficient of the image region for each image region. The high frequency component is a frequency component other than the highest-order LL component.

A method of correcting the conversion coefficient of the high frequency component is the same as that in step S314 of the image encoding method (FIG. 17) in the third embodiment.

Further, the conversion coefficient correction unit 323 corrects a conversion coefficient of the highest-order LL component by using 1 as a correction coefficient of the image region for each image region. In other words, the conversion coefficient correction unit 323 does not correct the conversion coefficient of the highest-order LL component.

Step S415 allows a corrected conversion coefficient to be obtained for each image region.

Step S416 is an entropy encoding process.

In step S416, an entropy encoding unit 312 performs entropy encoding on a corrected conversion coefficient of the image. This allows an encoded conversion coefficient of the image to be obtained. A method of the entropy encoding is the same as a conventional one.

Step S417 is a post quantization process.

In step S417, the post quantization unit 313 quantizes encoded conversion coefficients of the image. This allows compressed data to be obtained. The compressed data is data including quantized conversion coefficients of the image. A method of the quantization is the same as a conventional one.

Figure 26:
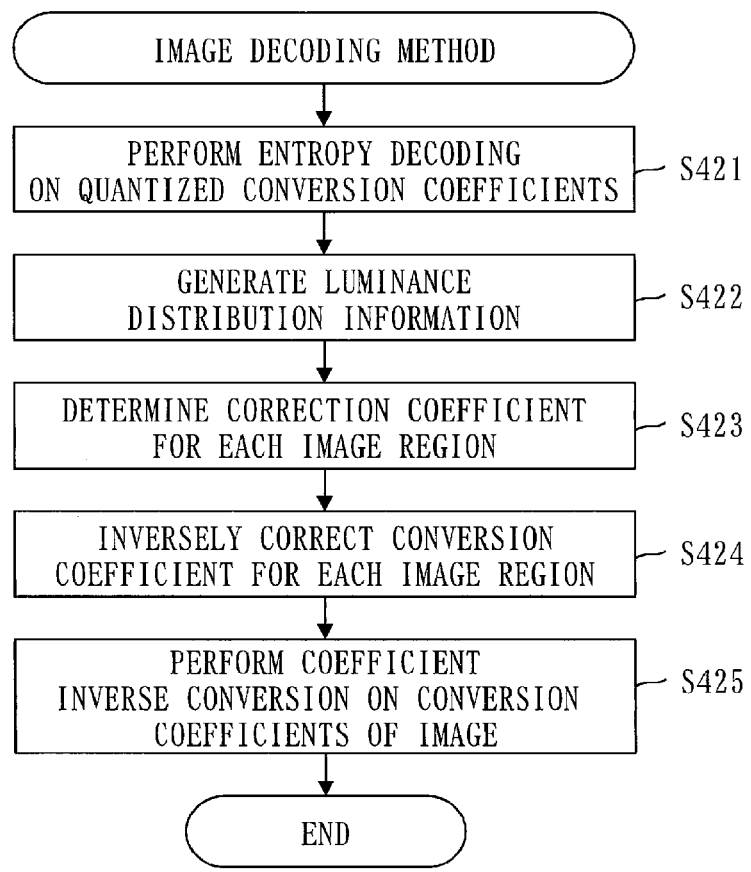
FIG. 26 is a flowchart of an image decoding method in the fourth embodiment.

An image decoding method will be described with reference to FIG. 26.

It is assumed that the compressed data obtained in step S417 of the image encoding method (FIG. 24) is stored in a storage unit 491.

Step S421 is an entropy decoding process.

In step S421, an entropy decoding unit 412 performs entropy decoding on quantized conversion coefficients of the image with use of the compressed data. This allows decoded conversion coefficients of the image to be obtained. Specifically, decoded DWT coefficients of the image is obtained. A method of the entropy decoding is the same as a conventional one.

Step S422 is a luminance distribution extraction process.

In step S422, a luminance distribution extraction unit 423 generates luminance distribution information with use of decoded DWT coefficients of the image.

Figure 24:
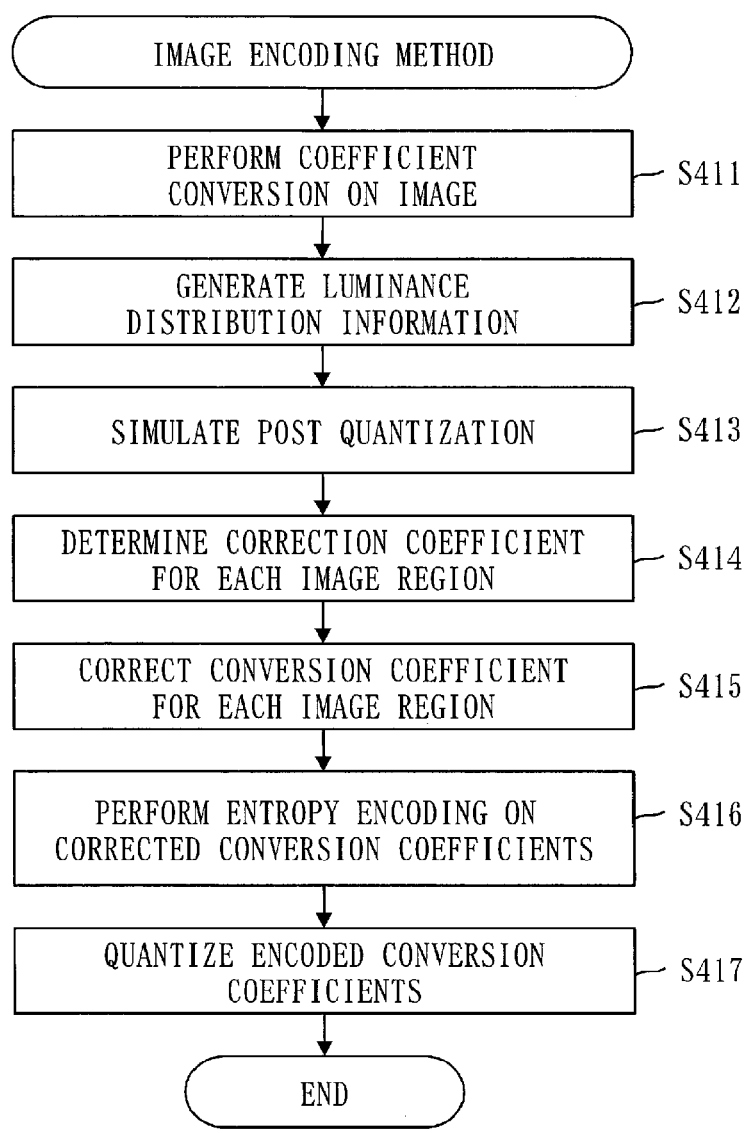
FIG. 24 is a flowchart of an image encoding method in the fourth embodiment.

A method of generating luminance distribution information is the same as that in step S412 of the image encoding method (FIG. 24).

Step S423 is a correction coefficient determination process.

In step S423, a correction coefficient determination unit 421 determines a correction coefficient for each image region with use of the luminance distribution information.

Features of the correction coefficient and a method of determining the correction coefficient are the same as those in step S313 of the image encoding method (FIG. 17) in the third embodiment.

Step S424 is a conversion coefficient inverse correction process.

In step S424, a conversion coefficient inverse correction unit 422 inversely corrects a conversion coefficient of a high frequency component with use of a correction coefficient of the image region for each image region. A method of inversely correcting the conversion coefficient of the high frequency component is the same as that in step S323 of the image decoding method (FIG. 18) in the third embodiment.

Further, the conversion coefficient inverse correction unit 422 inversely corrects a conversion coefficient of the highest-order LL component by using 1 as a correction coefficient of the image region for each image region. In other words, the conversion coefficient inverse correction unit 422 does not inversely correct the conversion coefficient of the highest-order LL component.

Step S424 allows a conversion coefficient of the image region to be obtained for each image region.

Step S425 is a coefficient inverse conversion process.

In step S425, a coefficient inverse conversion unit 411 performs coefficient inverse conversion on a conversion coefficient of the image. Specifically, the coefficient inverse conversion unit 411 performs two-dimensional inverse DWT on a DWT coefficient of the image. This allows image data including a decoded image to be obtained.

* Effect of Fourth Embodiment *

Transmission of a luminance distribution information from the image encoding apparatus 300 to the image decoding apparatus 400 becomes unnecessary. That is, since information requiring transmission is reduced, it is possible to achieve an effect similar to improvement of compression efficiency.

* Other Configuration *

The respective conversion coefficient correction units (323, 422) of the image encoding apparatus 300 and the image decoding apparatus 400 may correct a conversion coefficient of the highest-order LL component without setting a correction coefficient to 1. That is, the conversion coefficient correction unit (323, 422) may change the conversion coefficient of the highest-order LL component by correction, similarly to the third embodiment.

In this case, the image encoding apparatus 300 may not include the simulated quantization unit 324.

That is, the image encoding apparatus 300 may not perform step S413 of the image encoding method (FIG. 24). In that case, in step S414, the correction coefficient is determined for each image region with use of the luminance distribution information generated in step S412.

This makes it possible to significantly reduce a calculation amount.

The fourth embodiment may be applied to either a monochrome image or a color image.

Figure 22:
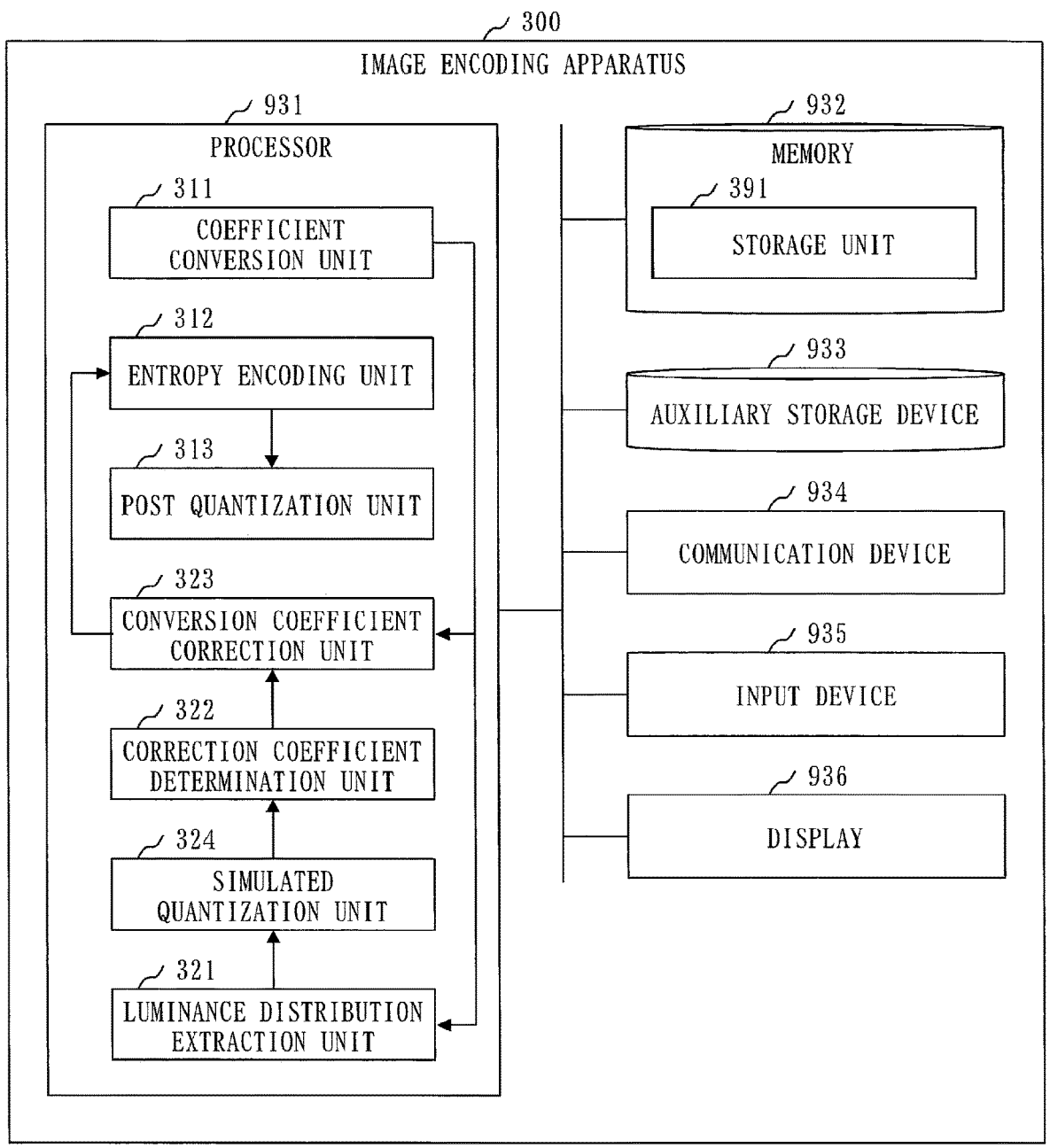
FIG. 22 is a configuration diagram of an image encoding apparatus 300 in a fourth embodiment.
Figure 23:
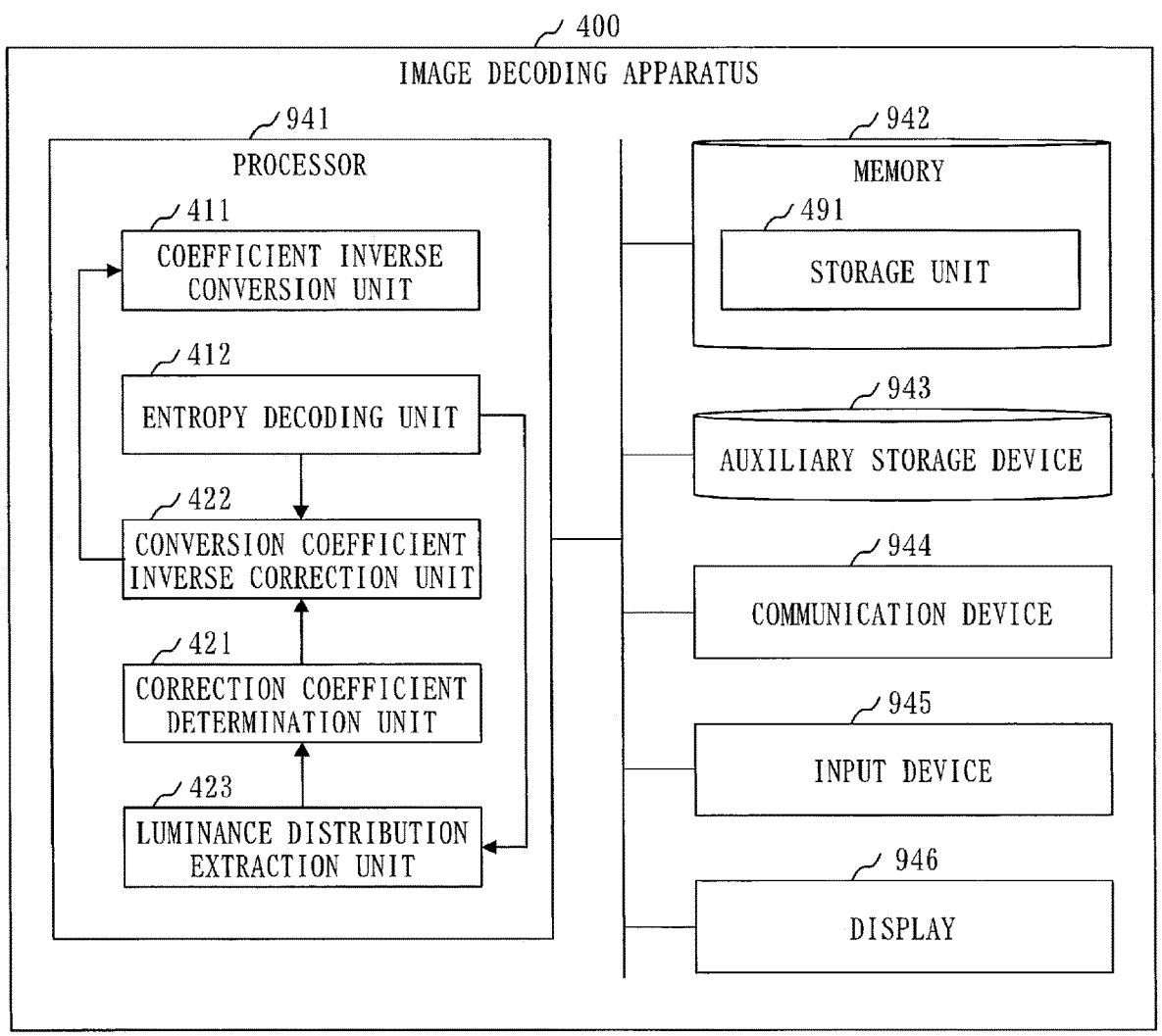
FIG. 23 is a configuration diagram of an image decoding apparatus 400 in the fourth embodiment.

The configuration of the image encoding apparatus 300 illustrated in FIG. 22 and the configuration of the image decoding apparatus 400 illustrated in FIG. 23 are configurations suitable for a monochrome image.

Figure 27:
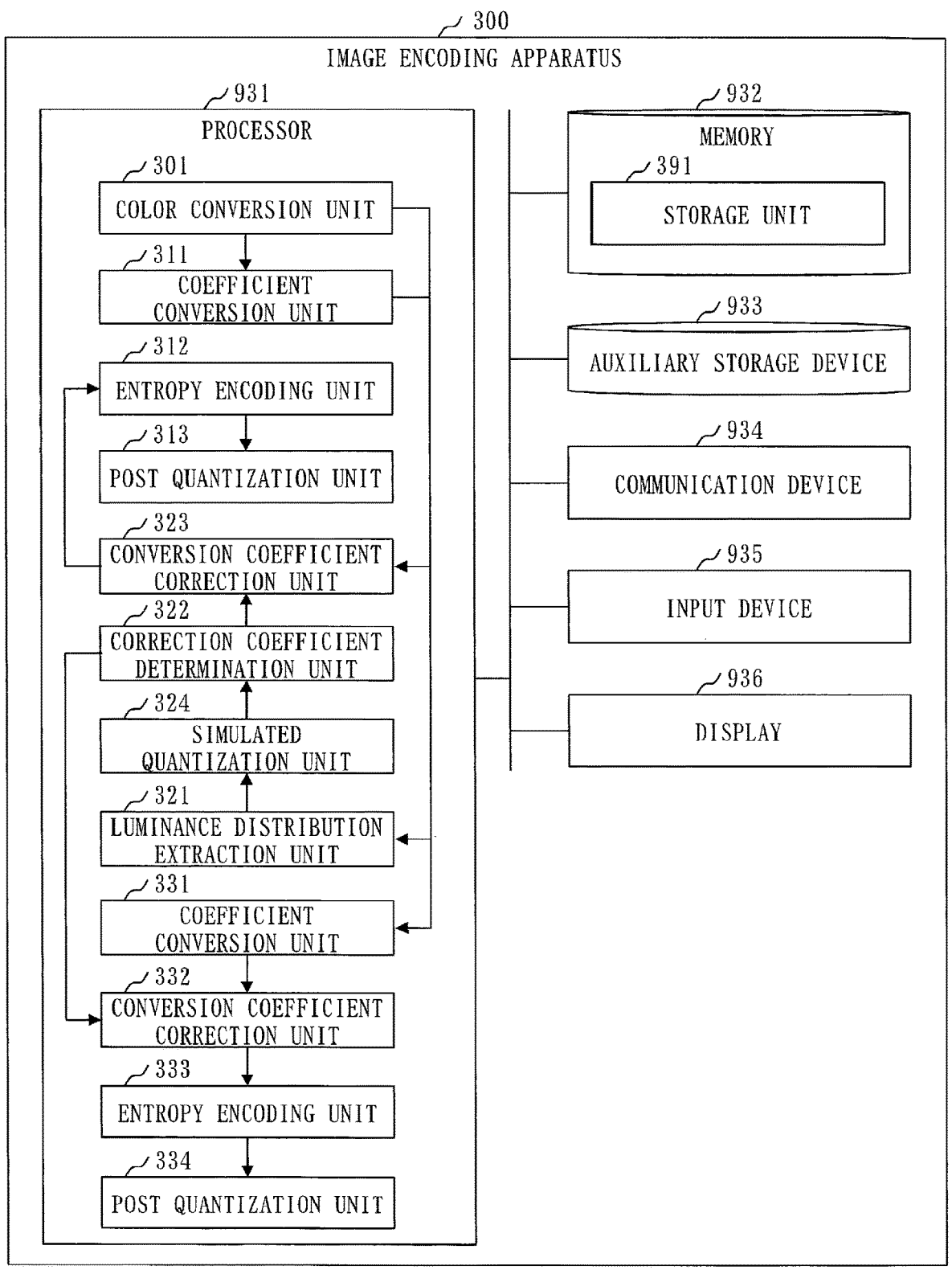
FIG. 27 is another configuration diagram of the image encoding apparatus 300 in the fourth embodiment.

A configuration of the image encoding apparatus 300 suitable for a color image will be described with reference to FIG. 27.

In addition to the elements of the functional configuration illustrated in FIG. 22, the image encoding apparatus 300 includes a color conversion unit 301, a coefficient conversion unit 331, a conversion coefficient correction unit 332, an entropy encoding unit 333, and a post quantization unit 334.

Figure 28:
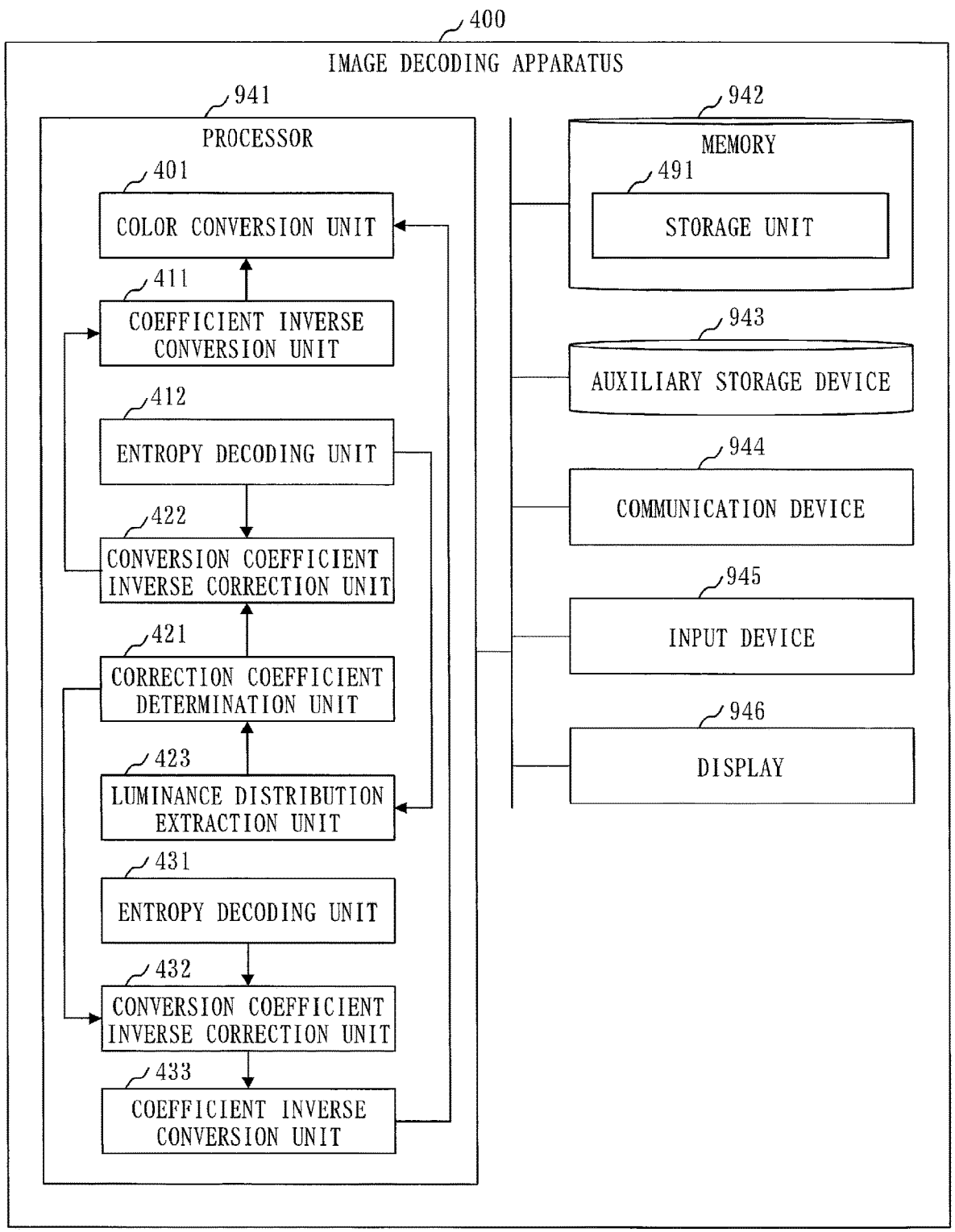
FIG. 28 is another configuration diagram of the image decoding apparatus 400 in the fourth embodiment.

A configuration of the image decoding apparatus 400 suitable for a color image will be described with reference to FIG. 28.

In addition to the elements of the functional configuration illustrated in FIG. 23, the image decoding apparatus 400 includes a color conversion unit 401, an entropy decoding unit 431, a conversion coefficient inverse correction unit 432, and a coefficient inverse conversion unit 433.

* Supplement to Embodiments *

In embodiments, a function of an image encoding apparatus (100, 300) may be realized by hardware.

Figure 29:
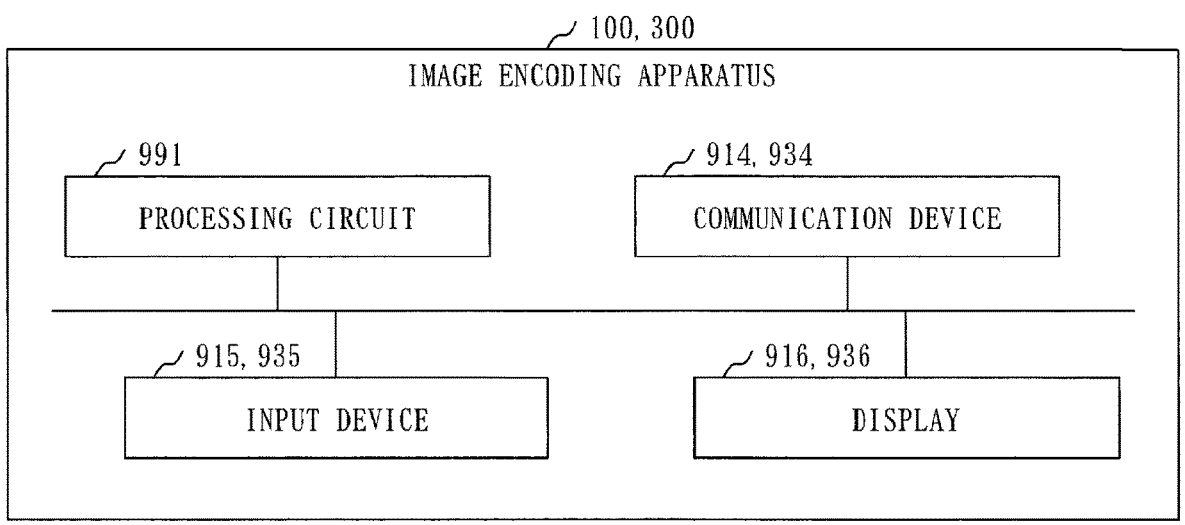
FIG. 29 is a hardware configuration diagram of an image encoding apparatus (100, 300) according to embodiments.

FIG. 29 illustrates a configuration in a case where the function of the image encoding apparatus (100, 300) is realized by hardware.

The image encoding apparatus (100, 300) includes a processing circuit 991.

The processing circuit 991 is also referred to as a processing circuitry.

In the image encoding apparatus 100, the processing circuit 991 is an exclusive electronic circuit to realize a function of "units" such as a coefficient conversion unit 111, a scalar quantization unit 112, an entropy encoding unit 113, a luminance distribution extraction unit 121, a correction coefficient determination unit 122, a quantization width correction unit 123, a simulated inverse quantization unit 124, and a storage unit 191.

In the image encoding apparatus 300, the processing circuit 991 is an exclusive electronic circuit to realize a function of "units" such as a coefficient conversion unit 311, an entropy encoding unit 312, a post quantization unit 313, a luminance distribution extraction unit 321, a correction coefficient determination unit 322, a conversion coefficient correction unit 323, a simulated quantization unit 324, and a storage unit 391.

Specifically, the processing circuit 991 is a single circuit, a composite circuit, a programmed processor, a parallel-programmed processor, a logic IC, a GA, an ASIC, an FPGA, or combination of these. GA is an abbreviation for Gate Array, ASIC is an abbreviation for Application Specific Integrated Circuit, and FPGA is an abbreviation for Field Programmable Gate Array.

The image encoding apparatus (100, 300) may include a plurality of processing circuits substituting for the processing circuit 991. The plurality of processing circuits share the function of the "unit".

A function of the image encoding apparatus (100, 300) may be realized by a combination of software and hardware. That is, a part of the function of the "unit" may be realized by software, and the rest of the function of the "unit" may be realized by hardware.

In embodiments, a function of an image decoding apparatus (200, 400) may be realized by hardware.

Figure 30:
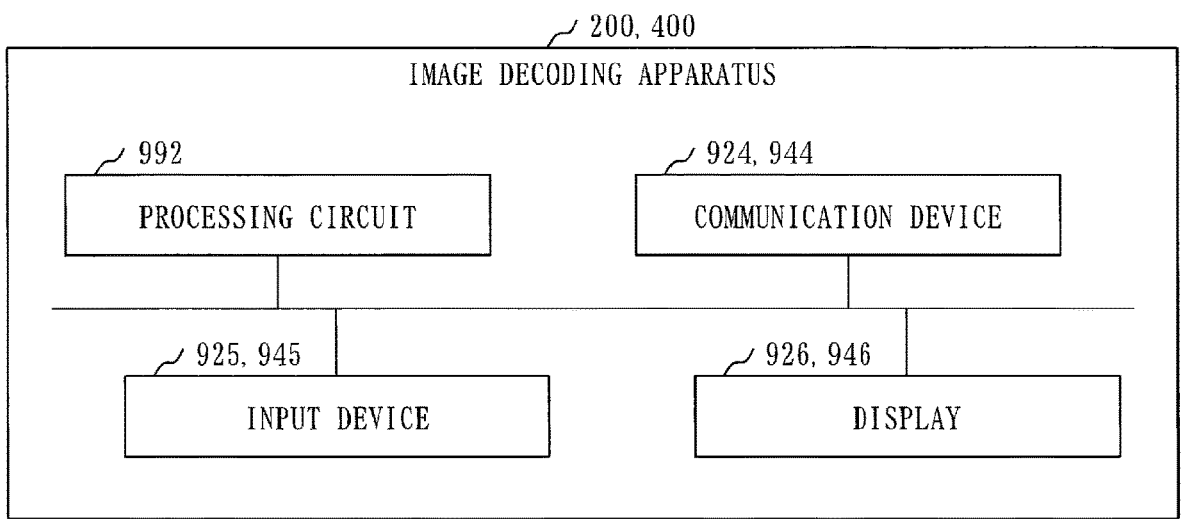
FIG. 30 is a hardware configuration diagram of an image decoding apparatus (200, 400) according to embodiments.

FIG. 30 illustrates a configuration in a case where a function of the image decoding apparatus (200, 400) is realized by hardware.

The image decoding apparatus (200, 400) includes a processing circuit 992. The processing circuit 992 is also referred to as a processing circuitry.

In the image decoding apparatus 200, the processing circuit 992 is an exclusive electronic circuit to realize a function of "units" such as a coefficient inverse conversion unit 211, a scalar inverse quantization unit 212, an entropy decoding unit 213, a correction coefficient determination unit 221, a quantization width correction unit 222, a luminance distribution extraction unit 223, a luminance inverse quantization unit 224, and a storage unit 291.

In the image decoding apparatus 400, the processing circuit 992 is an exclusive electronic circuit to realize a function of "units" such as a coefficient inverse conversion unit 411, an entropy decoding unit 412, a correction coefficient determination unit 421, a conversion coefficient inverse correction unit 422, a luminance distribution extraction unit 423, and a storage unit 491.

Specifically, the processing circuit 992 is a single circuit, a composite circuit, a programmed processor, a parallel-programmed processor, a logic IC, a GA, an ASIC, an FPGA, or combination of these.

The image decoding apparatus (200, 400) may include a plurality of processing circuits substituting for the processing circuit 992. The plurality of processing circuits share the function of the "unit".

A function of the image decoding apparatus (200, 400) may be realized by a combination of software and hardware. That is, a part of the function of the "unit" may be realized by software, and the rest of the function of the "unit" may be realized by hardware.

The embodiments are examples of preferred aspects and are not intended to limit the technical scope of the present invention. The embodiments may be implemented partially or in combination with other embodiments. The procedure described using a flowchart or the like may be changed as appropriate.

REFERENCE SIGNS LIST

100: image encoding apparatus, 101: color conversion unit, 111: coefficient conversion unit, 112: scalar quantization unit, 113: entropy encoding unit, 121: luminance distribution extraction unit, 122: correction coefficient determination unit, 123: quantization width correction unit, 124: simulated inverse quantization unit, 131: coefficient conversion unit, 132: scalar quantization unit, 133: entropy encoding unit, 191: storage unit, 200: image decoding apparatus, 201: color conversion unit, 211: coefficient inverse conversion unit, 212: scalar inverse quantization unit, 213: entropy decoding unit, 221: correction coefficient determination unit, 222: quantization width correction unit, 223: luminance distribution extraction unit, 224: luminance inverse quantization unit, 231: coefficient conversion unit, 232: scalar inverse quantization unit, 233: entropy decoding unit, 291: storage unit, 300: image encoding apparatus, 301: color conversion unit, 311: coefficient conversion unit, 312: entropy encoding unit, 313: post quantization unit, 321: luminance distribution extraction unit, 322: correction coefficient determination unit, 323: conversion coefficient correction unit, 324: simulated quantization unit, 331: coefficient conversion unit, 332: conversion coefficient correction unit, 333: entropy encoding unit, 334: post quantization unit, 391: storage unit, 400: image decoding apparatus, 401: color conversion unit, 411: coefficient inverse conversion unit, 412: entropy decoding unit, 421: correction coefficient determination unit, 422: conversion coefficient inverse correction unit, 423: luminance distribution extraction unit, 431: entropy decoding unit, 432: conversion coefficient inverse correction unit, 433: coefficient inverse conversion unit, 491: storage unit, 911, 921, 931, 941: processor, 912, 922, 932, 942: memory, 913, 923, 933, 943: auxiliary storage device, 914, 924, 934, 944: communication device, 915, 925, 935, 945: input device, 916, 926, 936, 946: display, 991, 992: processing circuit.

The invention claimed is:

1. An image encoding apparatus comprising:
processing circuitry configured to
   (i) obtain a discrete cosine transformation coefficient for each image region that is part of an image by performing discrete cosine transformation for each image region;
   (ii) generate luminance distribution information indicating a luminance of each image region with use of a direct current component included in the discrete cosine transformation coefficient of an image region for each image region as a luminance of an image region;
   (iii) obtain inversely quantized luminance distribution information by performing quantization on the luminance distribution information and performing inverse quantization on the quantized luminance distribution information;
   (iv) determine a correction coefficient for each image region with use of the inversely quantized luminance distribution information;
   (v) correct a quantization width of a component with use of the correction coefficient of the image region for each image region;
   (vi) quantize a conversion coefficient of the image region with use of the corrected quantization width for each image region; and
   (vii) perform entropy encoding on the quantized conversion coefficient for each image region, wherein the processing circuitry performs steps (i)-(vi) prior to step (vii).

2. A non-transitory computer readable medium storing an image encoding program to cause the image encoding apparatus according to claim 1 to function.

3. A method, implemented by processing circuitry of an image encoding apparatus, comprising:
   (i) obtaining a discrete cosine transformation coefficient for each image region that is part of an image by performing discrete cosine transformation for each image region;
   (ii) generating luminance distribution information indicating a luminance of each image region with use of a direct current component included in the discrete cosine transformation coefficient of an image region for each image region as a luminance of an image region;
   (iii) obtaining inversely quantized luminance distribution information by performing quantization on the luminance distribution information and performing inverse quantization on the quantized luminance distribution information;
   (iv) determining a correction coefficient for each image region with use of the inversely quantized luminance distribution information;
   (v) correcting a quantization width of a component with use of the correction coefficient of the image region for each image region;
   (vi) quantizing a conversion coefficient of the image region with use of the corrected quantization width for each image region; and
   (vii) performing entropy encoding on the quantized conversion coefficient for each image region, wherein steps (i)-(vi) are performed prior to step (vii).

* * * * *